United States Patent
Nakamura et al.

(10) Patent No.: US 11,034,522 B2
(45) Date of Patent: Jun. 15, 2021

(54) STICK DELIVERING APPARATUS AND SUPPORT ARM DEVICE THEREFOR

(71) Applicant: HITEC Co., Ltd., Kanagawa (JP)

(72) Inventors: Tatsuo Nakamura, Kanagawa (JP); Takayuki Fujimaki, Kanagawa (JP); Osamu Mochizuki, Kanagawa (JP)

(73) Assignee: Hitec Co., Ltd., Kanagawa (JP)

( * ) Notice: Subject to any disclaimer, the term of this patent is extended or adjusted under 35 U.S.C. 154(b) by 0 days.

(21) Appl. No.: 16/624,963

(22) PCT Filed: Apr. 25, 2019

(86) PCT No.: PCT/JP2019/017661
§ 371 (c)(1),
(2) Date: Dec. 20, 2019

(87) PCT Pub. No.: WO2019/239737
PCT Pub. Date: Dec. 19, 2019

(65) Prior Publication Data
US 2021/0122578 A1  Apr. 29, 2021

(30) Foreign Application Priority Data
Jun. 14, 2018  (JP) .............................. JP2018-113435

(51) Int. Cl.
*B65G 25/02*  (2006.01)
*A22C 15/00*  (2006.01)

(52) U.S. Cl.
CPC ............ *B65G 25/02* (2013.01); *A22C 15/001* (2013.01)

(58) Field of Classification Search
CPC ......... B65G 25/00; B65G 25/02; B66F 11/00; A22C 15/001

(Continued)

(56) References Cited

U.S. PATENT DOCUMENTS

| 2,993,606 | A | * | 7/1961 | Helstrom | .............. F27D 3/0024 |
|---|---|---|---|---|---|
| | | | | | 414/745.9 |
| 3,082,801 | A | * | 3/1963 | Dillingham | ............. B27L 1/122 |
| | | | | | 144/208.6 |

(Continued)

FOREIGN PATENT DOCUMENTS

| JP | 03112435 A | 5/1991 |
|---|---|---|
| JP | 10262545 A | 10/1998 |

(Continued)

OTHER PUBLICATIONS

Japanese search report for patent application No. PCT/JP2019/017661 dated Aug. 1, 2019.

*Primary Examiner* — Douglas A Hess
(74) *Attorney, Agent, or Firm* — Bachman & LaPointe, PC

(57) ABSTRACT

In a stick delivering apparatus I, a receiving space D capable of receiving a stick receiving part 2 of a cart II in a stick arrangement direction Y is formed at a position in close proximity to a support arm device 63 in a stick longitudinal direction X. The support arm device 63 includes a stationary stick supporting member 64 extending in the stick arrangement direction Y and a raising/lowering stick supporting member 65 extending in parallel with the stationary stick supporting member 64 in the stick longitudinal direction X. The stationary stick supporting member 64 and the raising/lowering stick supporting member 65 have serrated receiving tooth portions 64A and 65A, respectively, and the receiving tooth portions 64A and 65A have stick sliding edges 64A-1 and 65A-1 which are inclined with respect to a horizontal plane.

11 Claims, 15 Drawing Sheets

(58) Field of Classification Search
USPC ............. 414/745.1, 746.1; 198/774.1, 774.3, 198/774.4, 775, 777
See application file for complete search history.

(56) References Cited

U.S. PATENT DOCUMENTS

| | | | | | |
|---|---|---|---|---|---|
| 3,270,864 | A | * | 9/1966 | Kay | B23Q 7/001 198/777 |
| 3,604,435 | A | * | 9/1971 | Day, Jr. | B08B 9/28 134/61 |
| 3,662,876 | A | * | 5/1972 | Hollis | B65G 25/08 198/751 |
| 3,729,086 | A | * | 4/1973 | Phillips | B65G 25/08 198/751 |
| 3,738,510 | A | * | 6/1973 | Mason | B65G 57/18 414/789.5 |
| 4,264,253 | A | * | 4/1981 | Kennison | B65G 57/005 221/266 |
| 4,361,223 | A | * | 11/1982 | Johnson | B65G 25/08 198/751 |
| 5,062,523 | A | * | 11/1991 | Lenz | B65G 35/00 198/463.4 |
| 5,350,272 | A | * | 9/1994 | Bowlin | B65G 57/18 414/789.5 |
| 5,580,212 | A | * | 12/1996 | Andersson | 414/789.5 |
| 6,007,295 | A | * | 12/1999 | Sears | B65G 57/18 414/789.5 |
| 6,386,823 | B1 | * | 5/2002 | Perreault | B27B 31/00 198/608 |
| 6,439,829 | B1 | * | 8/2002 | Johnson | B65G 57/005 198/367 |
| 6,778,681 | B2 | * | 8/2004 | Garms | G01N 23/046 198/460.1 |
| 7,131,527 | B2 | * | 11/2006 | Robitaille | B27M 3/002 198/773 |
| 7,354,338 | B2 | * | 4/2008 | Nakamura | A22C 15/001 452/30 |
| 7,464,805 | B2 | * | 12/2008 | Wray | A23G 7/0031 198/443 |
| 7,588,485 | B1 | * | 9/2009 | Nakamura | A22C 15/001 452/51 |
| 9,451,780 | B2 | * | 9/2016 | Nakamura | A22C 15/002 |
| 9,796,505 | B1 | * | 10/2017 | Venero | B65D 19/02 |
| 10,723,568 | B2 | * | 7/2020 | Hurst | B65G 57/302 |

FOREIGN PATENT DOCUMENTS

| | | |
|---|---|---|
| JP | 2003180239 A | 7/2003 |
| JP | 2006016663 A | 1/2006 |
| JP | 2007185122 A | 7/2007 |
| JP | 2009023841 A | 2/2009 |
| JP | 2017145076 A | 8/2017 |

* cited by examiner

STICK DELIVERING APPARATUS AND SUPPORT ARM DEVICE THEREFOR

TECHNICAL FIELD

The present invention relates to a stick delivering apparatus for collectively delivering to a cart a plurality of sticks from each of which a stuffed casing with contents stuffed therein is suspended, and a support arm device therefor.

BACKGROUND ART

As a stick delivering apparatus of this type, for example, an apparatus disclosed in Patent Document 1 is known. This apparatus of Patent Document 1 includes a carrying-in mechanism for carrying in a stick with a chain of linked sausages suspended therefrom, a raising/lowering mechanism for taking up a stick from the carrying-in mechanism and lifting it up to a suspending height position for a cart, and a transfer mechanism for receiving the stick from the raising/lowering mechanism, transporting it to a predetermined hanging part of the cart, and transferring it to that hanging part.

This transfer mechanism in Patent Document 1 has a pair of chains each provided to circulate an arm jutting out in a horizontal direction from a raising/lowering mechanism liftable by being guided by a column, receives a stick from the raising/lowering mechanism, and moves it toward a distal end of the arm on the chain. The raising/lowering mechanism has a pair of chains each having hook-shaped holding bodies arranged at a fixed pitch, raises each stick consecutively by the holding bodies, and delivers each stick sequentially to the chains circulating around the arms of the transfer mechanism. The arm is positioned above one hanging part selected among a plurality of stages of hanging parts provided in the cart, and after the chain on each arm has taken up a predetermined number of sticks from the raising/lowering mechanism, the arm is lowered and collectively transfers these sticks onto the hanging parts of the cart. Such transferring operation is sequentially carried out with respect to each stage of the hanging part.

On the other hand, an apparatus which sequentially places a stick (rod) with sausage suspended therefrom on stick hanging beams is disclosed in Patent Document 2. In this Patent Document 2, pairs of stationary beams and pairs of movable stroke beams are provided which are positioned at both ends of the stick, and V-shaped notches for supporting the stick are arranged and formed on the stationary beams and the stroke beams at the same pitch. Each of the pair of stroke beams is positioned adjacent, on an outer side in the longitudinal direction of the stick, to each of the pair of stationary beams. Namely, one of the stationary beams and one of the stroke beams are adjacently positioned at one end position of the stick, and the other one of the stationary beams and the other one of the stroke beams are adjacently positioned at the other end position of the stick. The stroke beam has a mechanism whereby the stroke beam reciprocates in the longitudinal direction of the beam by one pitch of the notch and moves vertically between an upper position and a lower position with respect to the stationary beam. Thus, the stick arranged on the notch of the stationary beam is lifted up from the stationary beam by the reciprocal movement and vertical movement of the stroke beam, is advanced in the longitudinal direction of the beam by one pitch to be sent by one pitch at a time, and is supported again by the stationary beam.

PRIOR ART DOCUMENTS

Patent Documents

Patent Document 1: JP-A-2007-185122
Patent Document 2: JP-A-1991-112435

SUMMARY OF THE INVENTION

However, with the apparatus of Patent Document 1, in order to arrange a group of sticks at a fixed pitch by advancing the sticks received from the raising/lowering mechanism sequentially toward a front portion of the arm by the transfer mechanism, a chain of a long traveling distance is required for traveling so as to circulate around the arm by being wound around a pair of sprockets respectively provided at front and rear ends of the arm. At the same time, continuous traveling drive of the chain is required for the time period during which a group of sticks are being advanced by the chain, and the transfer mechanism becomes large-scaled in the overall mechanism.

Accordingly, it is conceivable to replace the transfer mechanism of Patent Document 1 by the apparatus of Patent Document 2 having beams.

However, as for the beams of Patent Document 2, although the stationary beam and the stroke beam are simple in structure, the mechanism for reciprocally moving and vertically moving the stroke beam is complex, and the cycle time is long from the start of feeding one stick and, after completion of one pitch feeding, until the return to the original position for feeding a next stick and the start of feeding the next stick. Namely, the feeding of a next stick cannot be started until one pitch feeding of one stick is completed, and therefore the cycle time becomes long. Furthermore, as for the operation of transferring the stick from the stroke beam to the stationary beam, since the stick is transferred to the stationary beam as the vertically movable stroke beam is lowered, so that the impact which the stick receives at the time of transfer is large. Since the cycle time cannot be made very short, if a setting is provided such that the lowering distance of the stroke beam is made small and the lowering is effected in a short time, the impact becomes even more greater.

In view of the above-described circumstances, an object of the present invention is to provide a stick delivering apparatus which has a simple mechanism, imparts a small impact at the time of delivering the stick, and is high in work efficiency with a short cycle time, and a support arm device therefor.

A stick delivering apparatus delivers sticks from support arm devices to stick receiving parts of a cart and comprises support arm devices having supporting portions by which a stick from which a stuffed casing with contents stuffed therein is suspended is supported at each end portion of the stick, the supporting portions being formed at a plurality of positions in a stick arrangement direction perpendicular to a longitudinal direction of the stick.

In such a stick delivering apparatus, in the present invention, the stick delivering apparatus is characterized in that a receiving space capable of receiving the stick receiving part of the cart in the stick arrangement direction is formed in the stick delivering apparatus at a position in close proximity to the support arm device in a stick longitudinal direction, and that the support arm device includes a stationary stick supporting member parallel with the stick receiving part of the cart and extending in the stick arrangement direction and a raising/lowering stick supporting member disposed in close proximity to the stationary stick supporting member in the stick longitudinal direction and extending in the stick arrangement direction in parallel therewith, wherein each of the stationary stick supporting member and the raising/lowering stick supporting member has a plurality of serrated receiving tooth portions, each of the receiving tooth portions has a stick sliding edge which is inclined with respect to a horizontal plane, and the stationary stick supporting member receives the stick by a trough portion which is a supporting portion formed by the receiving tooth portion, and wherein the receiving tooth portion of the raising/lowering stick supporting member is at a position offset in the stick arrangement direction from the receiving tooth portion of the stationary stick supporting member, and the raising/lowering stick supporting member is reciprocatable between a lower position and an upper position with respect to the stationary stick supporting member.

According to the present invention having such an arrangement, a stick with a stuffed casing suspended therefrom is brought to the stationary stick supporting member of the support arm by an appropriate means. The stick is supported by the trough portion of one of the plurality of receiving tooth portions formed in the stationary stick supporting member. In the raising/lowering stick supporting member adjacent to that stationary stick supporting member, the receiving tooth portions are positioned by being offset in the stick arrangement direction from the receiving tooth portions of the stationary stick supporting member, and the reciprocates between the lower position and the upper position with respect to the stationary stick supporting member. Accordingly, when the raising/lowering stick supporting member is raised from the lower position, the raising/lowering stick supporting member takes up the stick from the stationary stick supporting member, and brings the stick to the higher position. Since the receiving tooth portions of the stationary stick supporting member and the receiving tooth portions of the raising/lowering stick supporting member are positioned by being offset in the stick arrangement direction, the stick at the higher position is offset in the stick arrangement direction from the trough portion of the receiving tooth portion of the stationary stick supporting member, i.e., is positioned higher than the trough portion thereof. Next, when the raising/lowering stick supporting member is lowered toward the lower position, the stick is delivered to the receiving tooth portion of the stationary stick supporting member at an intermediate position, or a position closer to an upper end, of a stick sliding edge which is inclined above the trough portion of the stationary stick supporting member. Therefore, while the raising/lowering stick supporting member is being lowered toward the lower position, the stick slidingly moves toward the trough portion at the stick sliding edge in the receiving tooth portion of the stationary stick supporting member. Thus, the stick is advanced forwardly by a one-pitch portion of the receiving tooth portion on the receiving tooth portion of the stationary stick supporting member. While the stick is advancing forwardly by the one-pitch portion on the receiving tooth portion, the raising/lowering stick supporting member is returned to the position for taking up the next stick. Accordingly, since the forward advance of the stick on the stationary stick supporting member and the takeup operation of the next stick are carried out simultaneously, the cycle time of the operation of the raising/lowering stick supporting member required for one stick at the time of consecutively taking up the sticks from the stationary stick supporting member by the raising/lowering stick supporting member becomes short.

In the present invention, since the raising/lowering stick supporting member of the support arm device is merely adjacent to the stationary stick supporting member and is raised or lowered relative thereto, its driving mechanism becomes simple, and both members can be formed as plate members and become simple in shape, and the size in the stick longitudinal direction becomes small, so that the apparatus becomes compact.

In the present invention, the support arm devices may be provided in a plurality of stages in a vertical direction. Normally, since the stick receiving parts are provided in a plurality of stages in the cart, if the support arm devices are provided in a plurality of stages in correspondence thereto, the sticks on the plurality of stages of support arm devices can be collectively delivered to the cart side.

In the present invention, preferably, one of two upper edge portions forming the trough portion of the receiving tooth portion constitutes the stick sliding edge and has a gentler slope with respect to the horizontal plane than another one of the two upper edge portions. By adopting such an arrangement, it is possible to make the inclination of the stick sliding edge gentler without enlarging the pitch size of the tooth in the receiving tooth portion, and the impact becomes small at the time of stopping at the trough portion which is a terminating end in the sliding movement of the stick.

In the present invention, the stick delivering apparatus may preferably further comprise a stick carrying-in device for taking up each stick with the stuffed casing suspended therefrom and conveys the stick onto the receiving tooth portion of the stationary stick supporting member. By adopting such an arrangement, an advantage is obtained if stick with a stuffed casing suspended therefrom is arranged on the stick carrying-in device at a position facilitating the operation, e.g., at a low position, and if the stick is lifted by the stick carrying-in device up to the stationary stick supporting member located at a high position.

In the present invention, the stick delivering apparatus may preferably further comprise a stick transfer device which receives each stick from a suspending apparatus for suspending a stuffed casing from a stick and transfers the stick to the stick carrying-in device, and the stick carrying-in device has a stick takeup part for taking up the stick from the stick transfer device. By adopting such an arrangement, even if the stick delivering apparatus is installed at a position distant from the suspending apparatus, the stick can be transferred to the stick carrying-in device by the stick transfer device.

In the present invention, an arrangement may be provided such that the stick carrying-in device has a pair of hook-shaped stick takeup parts projecting in the stick arrangement direction and respectively provided at both ends of a horizontal member extending in the stick longitudinal direction, and is liftable between the stick transfer device and the stationary stick supporting member of the support arm device in the vertical direction, wherein the stick carrying-in device is movable in the stick arrangement direction, takes up a stick from the stick transfer device by the stick takeup parts, and conveys the stick to the receiving tooth portions of the stationary stick supporting members.

In the present invention, in substitution of the already described device for conveying the stick onto the receiving tooth portion of the stationary stick supporting member, the stick delivering apparatus may further comprise a stick carrying-in device for taking up each stick with the stuffed casing suspended therefrom and conveys the stick to a heightwise position of the receiving tooth portion of the stationary stick supporting member. Even if the stick is not conveyed to the receiving tooth portion, insofar as the stick is conveyed to the heightwise position of that receiving tooth portion, it suffices if a member for taking up the stick is provided on the support arm device side, and the stick is conveyed onto the receiving tooth portion after being taken up.

In the present invention, the stick carrying-in device may be formed by an endless traveling body which is provided with hook-shaped stick takeup parts projecting in such a manner as to be capable of retaining a stick and which travels in a circulating manner between an upper end direction-changing portion and a lower end direction-changing portion, and the endless traveling body may have a stick transporting zone in which the stick is transported by being supported by the stick takeup part and a return zone in which the endless traveling body travels in a stick absent state after discharging of the stick from the stick takeup part. By adopting such an arrangement, the taking up of the sticks can be sequentially effected not intermittently but continuously by the stick takeup parts provided on the endless traveling body traveling in one direction, thereby making it possible to effect continuous conveyance of sticks.

In the present invention, the stick delivering apparatus may further comprise a stick transfer device which receives each stick from a suspending apparatus for suspending a stuffed casing from a stick and transfers the stick to the stick carrying-in device, wherein a lower end position of the stick transporting zone in the endless traveling body of the stick carrying-in device is located below the position of stick transfer by the stick transfer device, and, when passing the stick transfer position in an upward direction, the hook-shaped stick takeup part of the stick carrying-in device takes up the stick from the stick transfer device.

In the present invention, the support arm device may have a stick receiving member which is reciprocatable between the receiving tooth portion of the stationary stick supporting member and the stick transporting zone in the endless traveling body of the stick carrying-in device in the stick arrangement direction, and when the stick takeup part on the endless traveling body has reached the heightwise position of the stick receiving member, the stick receiving member may receive the stick from the stick takeup part, move to the position of the receiving tooth portion of the stationary stick supporting member of the support arm device, and place the stick on the receiving tooth portion. By adopting such an arrangement, the stick receiving member is able to complete the reception of the stick and placement of the stick on the receiving tooth portion during the time interval between a point of time when one of the plurality of stick takeup parts provided on the endless traveling body passes the heightwise position of the stick receiving member and a point of time when a next stick takeup part passes that position.

Furthermore, in the present invention, the support arm device for a stick delivering apparatus may be provided with the following arrangement.

A support arm device for a stick delivering apparatus for delivering to a cart sticks from each of which a stuffed casing with contents stuffed therein is suspended, the support arm device comprising supporting portions for supporting each end portion of the stick, the supporting portions being formed at a plurality of positions in a stick arrangement direction perpendicular to a longitudinal direction of the stick, characterized in that the support arm device includes a stationary stick supporting member extending in the stick arrangement direction perpendicular to the longitudinal direction of the stick and a raising/lowering stick supporting member disposed in close proximity to the stationary stick supporting member in the stick longitudinal direction and extending in the stick arrangement direction in parallel therewith, wherein each of the stationary stick supporting member and the raising/lowering stick supporting member has a plurality of serrated receiving tooth portions, each of the receiving tooth portions has a stick sliding edge which is inclined with respect to a horizontal plane, and the stationary stick supporting member receives the stick by a trough portion which is a supporting portion formed by the receiving tooth portion, and wherein the receiving tooth portion of the raising/lowering stick supporting member is at a position offset in the stick arrangement direction from the receiving tooth portion of the stationary stick supporting member, and the raising/lowering stick supporting member is reciprocatable between a lower position and an upper position with respect to the stationary stick supporting member.

As described above, according to the present invention, the support arm device, which supports the stick with a stuffed casing suspended therefrom at both end portions of the stick, includes a stationary stick supporting member parallel with the stick receiving part of the cart and extending in the stick arrangement direction and a raising/lowering stick supporting member disposed in close proximity to the stationary stick supporting member in the stick longitudinal direction and extending in the stick arrangement direction in parallel therewith, wherein each of the stationary stick supporting member and the raising/lowering stick supporting member has a plurality of serrated receiving tooth portions, each of the receiving tooth portions has a stick sliding edge which is inclined with respect to a horizontal plane, and the stationary stick supporting member receives the stick by a trough portion which is a supporting portion formed by the receiving tooth portion, and wherein the receiving tooth portion of the raising/lowering stick supporting member is at a position offset in the stick arrangement direction from the receiving tooth portion of the stationary stick supporting member, and the raising/lowering stick supporting member is reciprocatable between a lower position and an upper position with respect to the stationary stick supporting member. Therefore, it is possible to obtain the advantage that the forward advance of the stick on the stationary stick supporting member and the takeup operation of the next stick are carried out simultaneously, so that the cycle time of the operation of the raising/lowering stick supporting member required for one stick at the time of consecutively taking up the sticks from the stationary stick supporting member by the raising/lowering stick supporting member becomes short.

Furthermore, in the present invention, since the raising/lowering stick supporting member of the support arm device is merely adjacent to the stationary stick supporting member and is raised or lowered relative thereto, advantages are obtained in that the driving mechanism thereof becomes simple, and both members can be formed as plate members and become simple in shape, and the size in the stick longitudinal direction becomes small, so that the apparatus becomes compact.

DETAILED DESCRIPTION

Hereafter, a description will be given of the mode for carrying out the invention on the basis of the accompanying drawings.

First Embodiment

Figure 1:
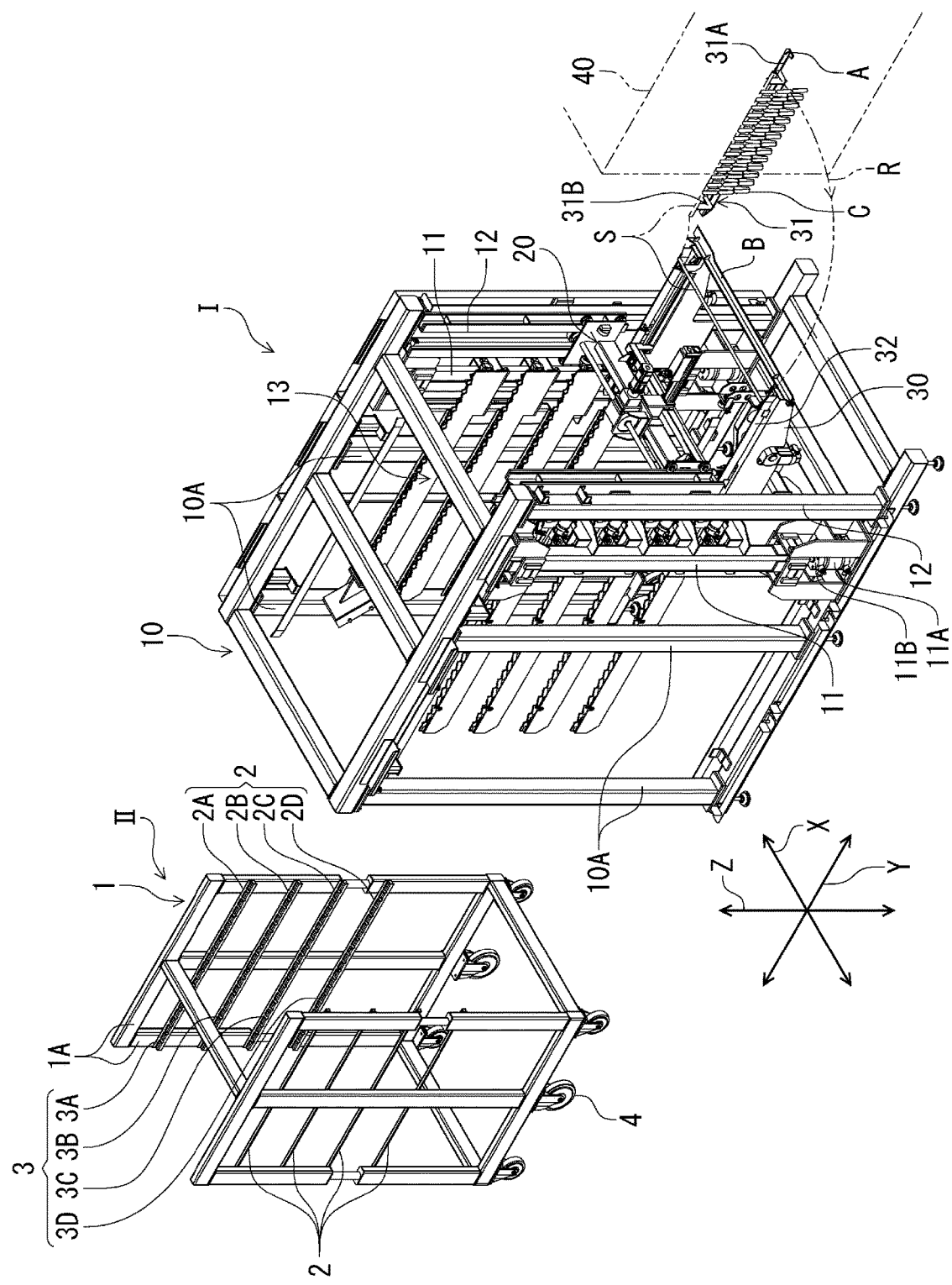
FIG. 1 is a perspective view illustrating a stick delivering apparatus as a first embodiment of the present invention together with a cart.
Figure 2:
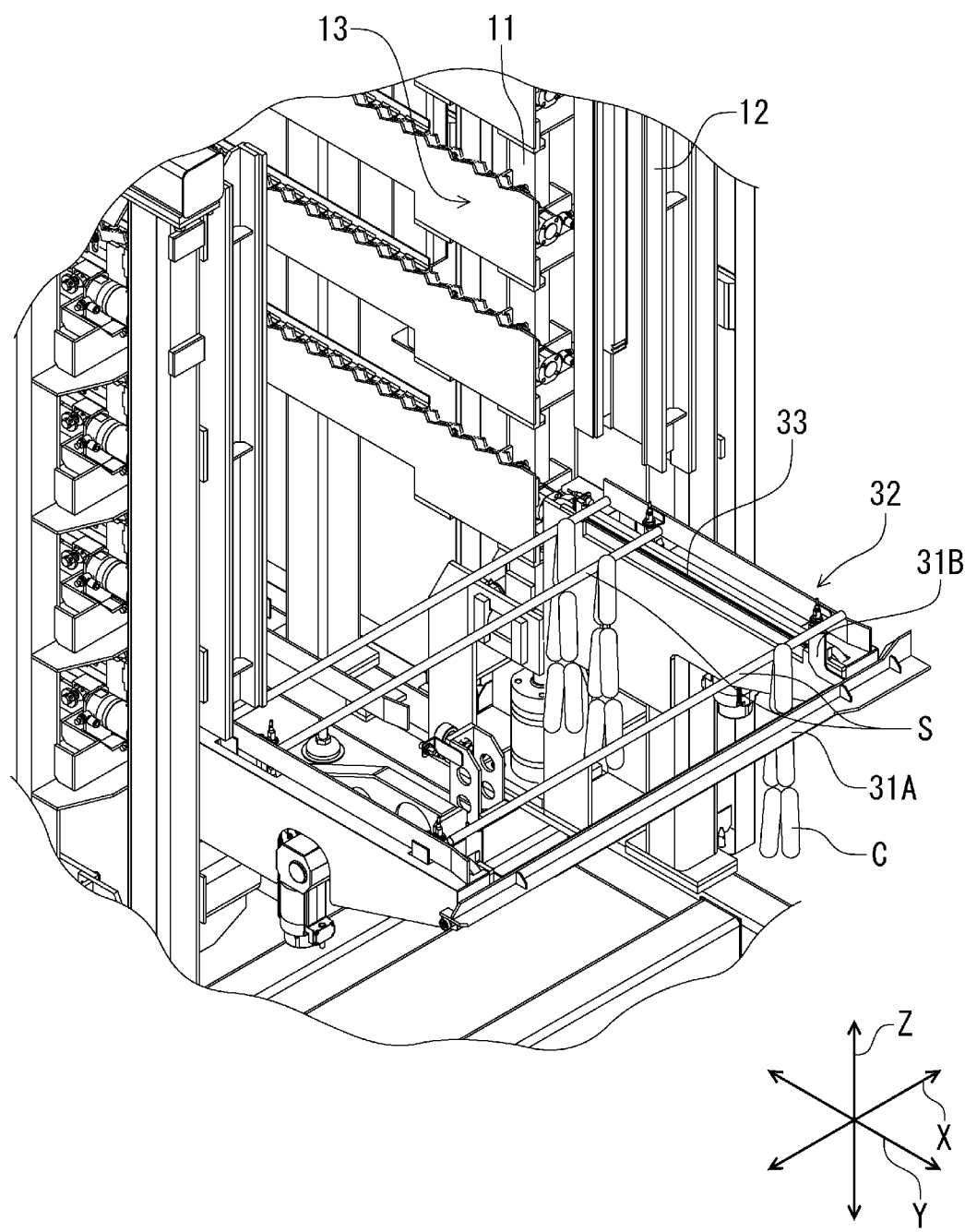
FIG. 2 is an enlarged partial perspective view of a forward transfer unit of a stick transfer device in the apparatus of FIG. 1, illustrating a state in which a stick carrying-in device is being raised.

As shown in FIG. 1, a stick delivering apparatus I in accordance with a first embodiment of the invention is an apparatus which delivers to a cart II sticks S each having a stuffed casing with the contents stuffed therein, e.g., looped sausages, suspended therefrom. With reference to FIG. 1, a brief description will be given of the cart II prior to the description of the stick delivering apparatus I. It should be noted that, in order to clarify the directions, three-dimensional space coordinates are set, and it is assumed that the longitudinal direction of the stick in which the stick S extends in the stick delivering apparatus I immediately before the delivery of the stick S to the cart II is X, that the stick arrangement direction in which the stick S is arranged perpendicularly to the stick longitudinal direction X within a horizontal plane is Y, and that the vertical direction is Z.

As shown in FIG. 1, the cart II has a frame body 1 which forms a rectangular parallelepiped outer frame by connecting a plurality of linear members extending in the stick longitudinal direction X, the stick arrangement direction Y, and the vertical direction Z, and in an internal space of which no members are present, wherein straight member-shaped stick receiving parts 2 extending in the stick arrangement direction Y are attached at a plurality of positions in the vertical direction Z to inner surfaces of two side frame parts 1A opposed to each other in the stick arrangement direction Y of the frame body 1.

The stick receiving parts 2 are formed in four stages in the illustrated example, and stick receiving parts 2A, 2B, 2C, and 2D are provided from the top.

A series of stick receiving grooves 3 (3A, 3B, 3C, and 3D) for receiving end portions of the sticks S are formed on each stick receiving part 2 (2A, 2B, 2C, and 2D) at intervals in the stick arrangement direction Y. This stick receiving groove 3 is formed in each of the stick receiving parts 2 attached to the side frame parts 1A located on opposite sides of the frame body 1 in the stick longitudinal direction X in such a manner as to oppose each other in that direction and in an open state. Both ends of the stick S are received by corresponding ones of the stick receiving grooves 3 (grooves 3A, grooves 3B, grooves 3C, and grooves 3D) which are formed on both side frame parts 1A opposing each other.

The above-described cart II is movable on the floor surface, and wheels 4 are provided at the bottom of the frame body 1 in the illustrated case.

The stick delivering apparatus I, which receives this cart II in the aforementioned stick arrangement direction Y, has an outer frame body 10 having an outer frame of a rectangular parallelepiped outer shape larger than the cart II in the respective directions of the stick longitudinal direction X, the stick arrangement direction Y, and the vertical direction Z, and the outer frame body 10 is formed by connecting linear members extending in the respective directions X, Y, and Z. On the outer frame body 10, a pair of support arm columns 11 extending in the vertical direction Z are respectively provided in the rear of (farther side from the cart II) of side frame parts 10A located on both sides of the outer frame body 10 in the stick longitudinal direction X, and a pair of guide poles 12 are provided at positions rearward thereof.

The stick delivering apparatus I is provided with support arm devices 13 for temporarily arranging and supporting the sticks S with the stuffed casings suspended therefrom, before receiving the sticks S from a below-described suspending apparatus 40 and delivering them to the cart II. The support arm devices 13 are supported by the support arm columns 11 respectively located at the same side ends in the stick longitudinal direction X, and are provided at a plurality of positions in the vertical direction Z (in the illustrated example, at four-stage positions). Each support arm device 13 extends forwardly toward the cart II in the stick arrangement direction Y at an inner position with respect to the support arm column 11 in the stick longitudinal direction X, while maintaining an interval with the side frame part 10A of the outer frame body 10. The aforementioned interval between the above-described support arm device 13 and the outer frame body 10 forms a receiving space D (see FIG. 5(B)) for the entry therethrough of the corresponding side frame part 1A of the above-described cart II and the stick receiving part 2 attached thereon. Each of the support arm columns 11 located on both sides in the stick longitudinal direction X has at a lower portion thereof a movable part 11B which is extended or contracted in the vertical direction Z by a drive unit 11A such as a motor, so that, by the operation of that movable part 11B, the plurality of stages of the support arm devices 13 supported by the support arm columns 11 are collectively moved vertically, together with the support arm columns 11, by the extended or contracted distance of the movable part 11B at a predetermined timing. The aforementioned support arm devices 13 are supported by the respective support arm columns 11 located on both sides in the stick longitudinal direction X, and the support arm device 13 shown in FIG. 3 is shown as the support arm device 13 located on this side in the stick longitudinal direction X in FIG. 1.

The support arm device 13 has a stationary stick supporting member 14 which is mounted on the support arm column 11 immovably in the stick longitudinal direction X, the stick arrangement direction Y, and the vertical direction Z, a raising/lowering stick supporting member 15 which is raised and lowered movably in the vertical direction Z with respect to that stationary stick supporting member 14, and a raising/lowering supporting member driving unit 16 for liftably driving that raising/lowering stick supporting member 15.

Figure 3:
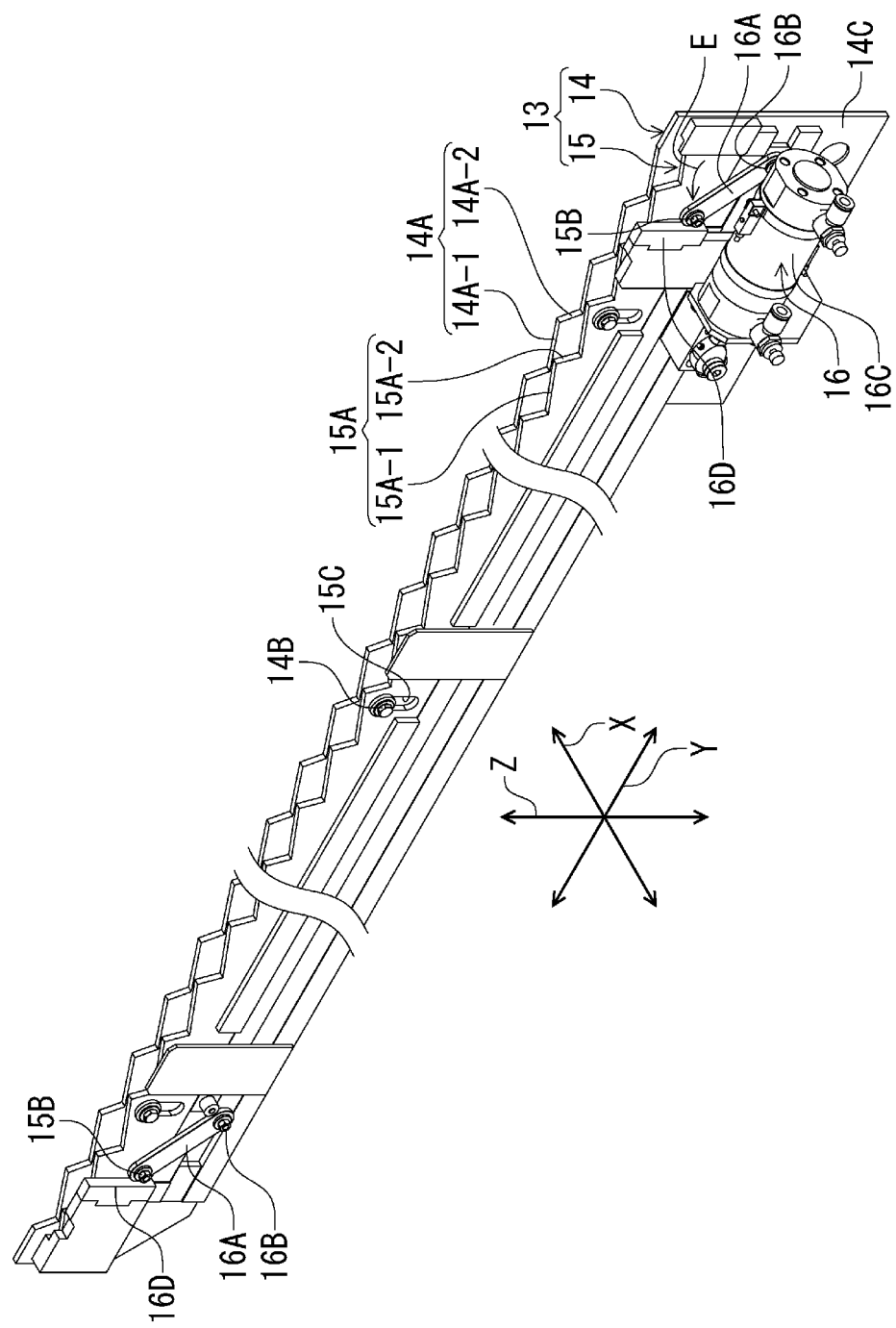
FIG. 3 is a perspective view illustrating a support arm device in the apparatus of FIG. 1.

As shown in FIG. 3, the stationary stick supporting member 14 and the raising/lowering stick supporting member 15 are both fabricated as serrated members elongated in the stick arrangement direction Y while maintaining flat surfaces of metal plates as they are, and the stationary stick supporting member 14 and the raising/lowering stick supporting member 15 are arranged adjacent to each other in the plate thickness direction which is the stick longitudinal direction X.

The stationary stick supporting member 14 has a plurality of receiving tooth portions 14A at an upper edge thereof over a substantially entire length in the back-and-forth direction which is the stick arrangement direction Y. Each receiving tooth portion 14A has a stick sliding edge 14A-1 with a gentle slope from the apex of the receiving tooth portion 14A toward the front and a supporting edge 14A-2 with a sharp slope from that apex toward the rear. The stick sliding edge 14A-1 and the supporting edge 14A-2 form a trough portion serving as a supporting portion for the stick S.

In the same way as the stationary stick supporting member 14, the raising/lowering stick supporting member 15 has a plurality of receiving tooth portions 15A at an upper edge thereof over the substantially entire length thereof. Each receiving tooth portion 15A has a stick sliding edge 15A-1 with a gentle slope from the apex of the receiving tooth portion 15A toward the front and a supporting edge 15A-2 with a sharp slope from that apex toward the rear. The stick sliding edge 15A-1 and the supporting edge 15A-2 forms a trough portion serving as a supporting portion for the stick S. Here, the stick sliding edge 15A-1 of the raising/lowering stick supporting member 15 has a slightly sharper slope than the stick sliding edge 14A-1 of the stationary stick supporting member 14, but the stick sliding edge 15A-1 and the stick sliding edge 14A-1 may be provided with the same slope.

The stationary stick supporting member 14 extends downwardly of the raising/lowering stick supporting member 15 in the vertical direction Z, has a basal portion 14C at a rear end portion thereof, and is fixedly mounted on the support arm column 11 at that basal portion 14C. In other words, the stationary stick supporting member 14 is fixed to the support arm column 11 at that basal portion 14C, and extends in a cantilevered manner in the form of an arm forwardly of the basal portion 14C in the stick arrangement direction Y.

The basal portion 14C reaches down to a position lower than its adjacent raising/lowering stick supporting member 15, and the raising/lowering supporting member driving unit 16 is mounted at a rear portion thereof positioned lower than the raising/lowering stick supporting member 15.

Guide pins 14B for guiding the raising or lowering of the raising/lowering stick supporting member 15 are provided on the stationary stick supporting member 14 at a plurality of positions in the back-and-forth direction (stick arrangement direction Y). Further, a rotating shaft 16B is attached to each of front and rear ends of the stationary stick supporting member 14 at a lower edge thereof located below the raising/lowering stick supporting member 15, and a drive lever 16A constituting a part of the aforementioned raising/lowering supporting member driving unit 16 is provided so as to be reciprocatingly rotationally driven by the rotating shaft 16B. The rotating shaft 16B positioned on the rear end side is reciprocatingly rotationally driven by a drive unit 16C including a motor, a gear, and the like of the raising/lowering supporting member driving unit 16.

As for the raising/lowering stick supporting member 15, the plurality of receiving tooth portions 15A formed at its upper edge are formed in approximately the same number and at approximately the same pitch as the receiving tooth portions 14A of the stationary stick supporting member 14, but are at positions shifted from the receiving tooth portions 14A of the stationary stick supporting member 14 in the back-and-forth direction which is the stick arrangement direction Y. Namely, the phases in the back-and-forth direction are offset.

On the raising/lowering stick supporting member 15, a driven shaft 15B is provided which is rotatably (rotation in the direction of arrow E in FIG. 3) coupled to an upper end of the aforementioned drive lever 16A, and a guide groove 15C, which engages with the guide pin 14B of the stationary stick supporting member 14, is formed as an elongated hole extending vertically and at a plurality of positions in the back-and-forth direction, i.e., at three positions in the illustrated example. The aforementioned drive lever 16A is reciprocatingly rotated, as already described, and its rotational angle is restricted by a stopper 16D provided on the stationary stick supporting member 14.

As for the behavior of the support arm device 13 having such a configuration, a detailed description will be given in the description of the operation of the stick delivering apparatus I after the description of various devices other than the support arm device 13 of the stick delivering apparatus I.

Figure 4:
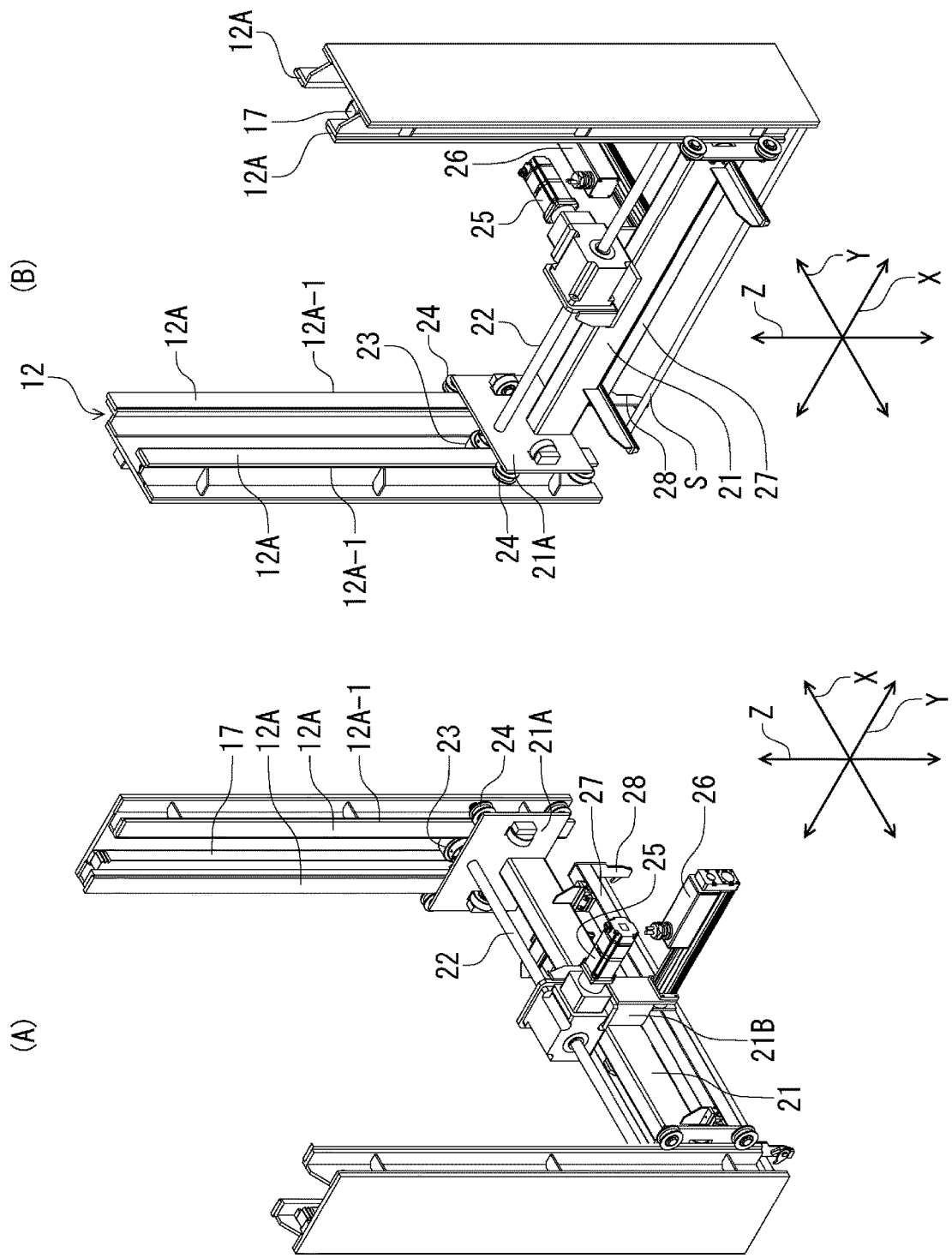
FIG. 4 is a perspective view illustrating the stick carrying-in device in the apparatus of FIG. 1, in which part (A) is a view taken from the rear side in a stick arrangement direction, and part (B) is a view taken from the front side.

A stick carrying-in device 20 is liftably guided and supported by the pair of guide poles 12 each located immediately rearwardly of the support arm column 11 for supporting the support arm device 13. As shown in detail in parts (A) and (B) of FIG. 4, the guide pole 12 is provided such that two rails 12A of a U-shaped cross section extend in parallel with each other in the vertical direction Z in such a manner as to oppose each other in the back-and-forth direction which is the stick arrangement direction Y. A rack 17 extending is the vertical direction Z is provided between the rails 12A, and an outer edge of each of these two rails 12A serves as a guide edge 12A-1.

The stick carrying-in device 20 is a device which, in FIG. 1, takes up each stick S with the stuffed casing suspended therefrom from a below-described stick transfer device 30 positioned therebelow, lifts it upward, and conveys it onto the receiving tooth portions 14A of the stationary stick supporting members 14. As shown in the parts (A) and (B) of FIG. 4, the stick carrying-in device 20 includes a base body part 21 constituting a rectangular bar-shaped horizontal member extending in the stick longitudinal direction X; a pair of base body end plate portions 21A respectively mounted at both ends of the base body part 21; a drive shaft 22 which is rotatably supported by being passed through the respective base body end plate portions 21A and extends in parallel with the base body part 21; a pair of pinions 23 mounted respectively on both ends of the drive shaft 22; rotatable guide rollers 24 mounted on the respective base body end plate portion 21A; a rotational drive unit 25 mounted on top of a block body 21B attached to a rear end of the base body part 21 at a central position in the stick longitudinal direction X; a linear drive unit 26 mounted on a lower portion of the block body 21B; a support arm 27 mounted at a front end of the linear drive unit 26 and extending in the stick longitudinal direction X; and a pair of hook-shaped stick takeup parts 28 respectively suspended from both end positions of the support arm 27.

The aforementioned pinion 23 meshes with the rack 17, and the pinion 23 rotates with the drive shaft 22 driven by the rotational drive unit 25 at a predetermined timing, so as to move in the vertical direction Z along the rack 17. At that juncture, the guide rollers 24 are guided in the vertical direction by the guide edges 12A-1 of the rails 12A. Meanwhile, the linear drive unit 26, which is formed by a cylinder or the like operating in the stick arrangement direction Y, moves the support arm 27 back and forth in the stick arrangement direction Y at a predetermined timing.

The stick transfer device 30 is provided at a position which, with respect to the above-described stick carrying-in device 20, is in the rear in the stick arrangement direction Y and on the lower side in the vertical direction Z in FIG. 1. This stick transfer device 30 includes a horizontal rotational transfer unit 31 and a forward transfer unit 32. The horizontal rotational transfer unit 31 has a straight swinging member 31A and is formed such that the swinging member 31A, while supporting the stick S, reciprocatingly rotationally moves (swings) between a position A in close proximity to the suspending apparatus in a horizontal plane and a position B above the rear of the forward transfer unit 32, which is a position for transferring the stick S to the forward transfer unit 32, and the swinging member 31A is temporarily lowered at that rear upper position B. An L-shaped hook-like receiving portion 31B for supporting each end of the stick S is provided at each end of the swinging member 31A. The horizontal rotational transfer unit 31 receives the stuffed casing suspending stick S by the receiving portions 31B from the suspending apparatus 40 at the position A in close proximity to, and in parallel with, the suspending apparatus 40. Thereafter, the swinging member 31A rotates by approximately 90° in the horizontal plane about one end side thereof and conveys the stick S to the position B above the rear of the forward transfer unit 32.

The forward transfer unit 32 has a pair of chains 33 which are supported at inner side positions of the side frame parts 10A on both sides of the outer frame body 10 and are each wound around two sprockets located in the front and the rear in the stick arrangement direction Y. Upper paths of the chains 33 are adapted to travel forwardly, and these two chains 33 are adapted to move the stick S forwardly, while supporting both ends of the stick S received from the horizontal rotational transfer unit 31.

Next, a description will be given of a series of operation of delivering the stick S with the stuffed casing suspended therefrom from the suspending apparatus 40 to the cart II in the embodiment having the above-described configuration.

First, the swinging member 31A of the horizontal rotational transfer unit 31 of the stick transfer device 30 is brought to the position A in close proximity to the suspending apparatus 40, and the stick S having a stuffed casing C suspended therefrom and discharged from the suspending apparatus 40 is received by the receiving portions 31B at both ends of the swinging member 31A of the horizontal rotational transfer unit 31.

In the horizontal rotational transfer unit 31, its swinging member 31A is rotated 90° in the direction of arrow R about one end side thereof to convey the stick S to the position B above the rear of the forward transfer unit 32, whereupon the swinging member 31A is lowered. As a result of this lowering, the stick S is delivered onto the chains 33 at a rear position of the forward transfer unit 32. Subsequently, in order to receive a next stick S from the suspending apparatus 40, the swinging member 31A of the horizontal rotational transfer unit 31 rotates in an opposing direction to the arrow R as it is in the lowered state, and returns to the position A. The stick S delivered onto the chains 33 is transferred forwardly by the chains 33 and, after advancing up to a predetermined position, the stick S is stopped by the operation of a stopper or the like at the forward end position.

Next, the base body part 21 of the stick carrying-in device 20 is lowered by the rotation of the pinions 23 driven by the rotational drive unit 25, the support arm 27 is moved rearwardly in the stick arrangement direction Y relative to the aforementioned base body part 21 by the driving of the linear drive unit 26 mounted on the base body part 21, and the hook-shaped stick takeup parts 28 provided at both ends of the support arm 27 are located in the rear of and on the lower side of the stick S which is stopped at the forwardly advanced position on the chains 33. Thereafter, the rotational drive unit 25 and the linear drive unit 26 are operated in opposite directions to allow the support arm 27 to be raised and moved forwardly by a sufficient distance for the takeup of the stick S, whereby the stick S is taken up from the chains 33 by the hook-shaped stick takeup parts 28 and is conveyed upwardly.

The stick S taken up by the stick takeup parts 28 of the stick carrying-in device 20 is brought to a position slightly above the support arm device 13 selected among the four-stage support arm devices 13 by the driving of the rotational drive unit 25, e.g., an uppermost-stage support arm device 13. Subsequently, the stick S is advanced forwardly by the driving of the linear drive unit 26 and is brought to a position above a rearmost receiving tooth portion 14A in the stationary stick supporting member 14 of the support arm device 13. Then, as the stick takeup parts 28 are lowered by a predetermined height, the stick S is delivered to the receiving tooth portion 14A. Immediately after delivering the stick S to the receiving tooth portion 14A, the stick takeup parts 28 of the stick carrying-in device 20 are lowered to the position of the respective chain 33 of the forward transfer unit 32 so as to take up a next stick S. Thus, during the time period after, in order for the stick carrying-in device 20 to take up a next stick, the stick takeup parts 28 are lowered and take up the next stick and until the stick takeup parts 28 are raised again and convey the stick to the stationary stick supporting members 14, the preceding stick S is advanced forwardly on the stationary stick supporting members 14.

Figure 5:
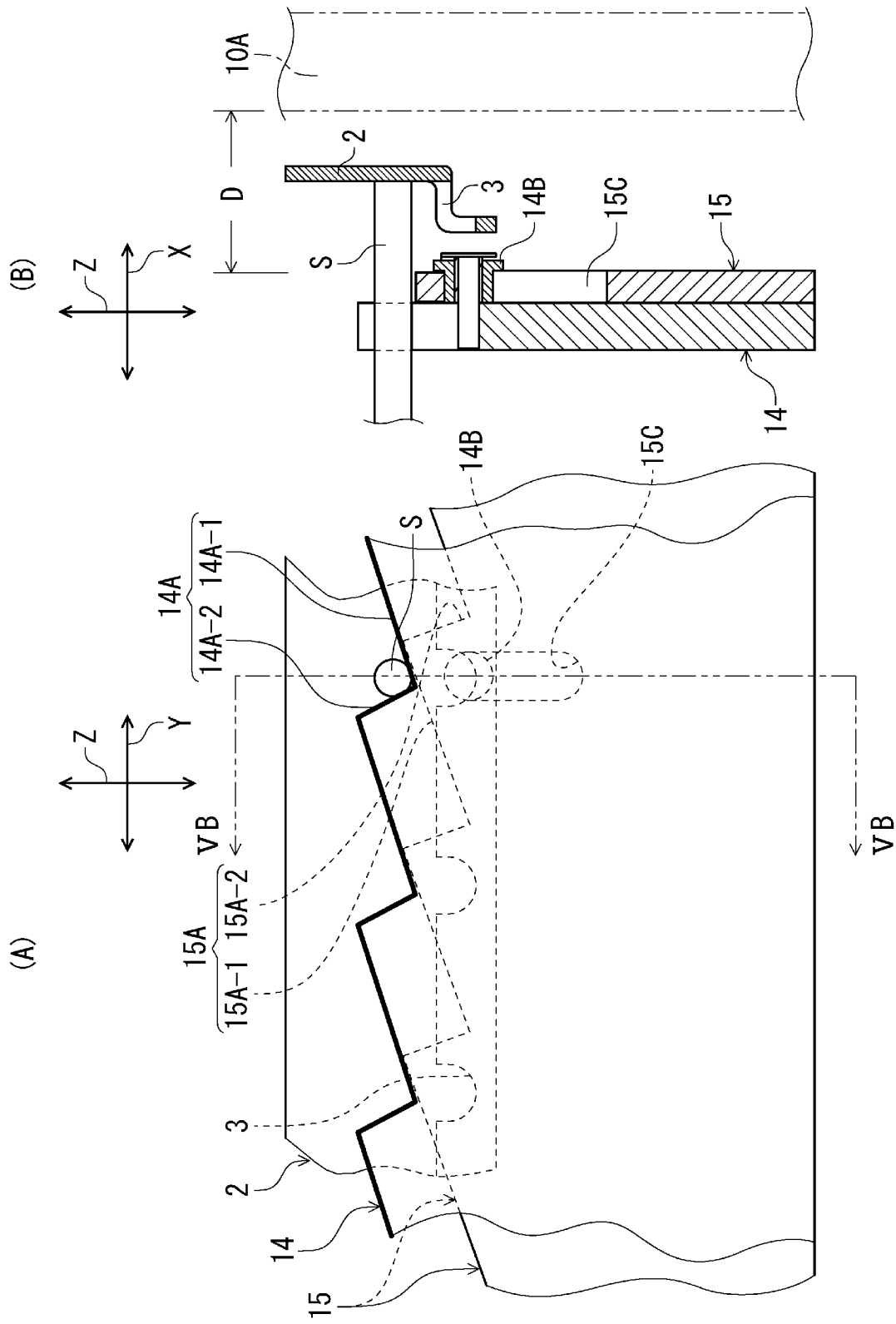
FIG. 5 illustrates the support arm device and a stick receiving part of the cart when a raising/lowering stick supporting member is at a lower position, in which part (A) is a side elevational view, and part (B) is a cross-sectional view taken along VB-VB.

Next, a description will be given of the behavior of the above-described stick S delivered to the support arm device 13 together with a detailed configuration of the support arm device 13. The support arm device 13 has the stationary stick supporting member 14 and the raising/lowering stick supporting member 15 which are disposed in close proximity to each other in the plate thickness direction of metallic plates which is the stick longitudinal direction X. As shown in FIG. 5(A), the receiving tooth portions 14A of the stationary stick supporting member 14 and the receiving tooth portions 15A of the raising/lowering stick supporting member 15 are of the same pitch in distance in the stick arrangement direction Y, but their positions are shifted from each other. Namely, the phases of the receiving tooth portions 14A and 15A are offset. With respect to the stationary stick supporting member 14, the raising/lowering stick supporting member 15 is adapted to effect relative movement only in the vertical direction Z. The raising/lowering stick supporting member 15 is raised from a lower position shown in the parts (A) and (B) of FIG. 5 to an upper position (the position indicated by two-dot chain lines in FIG. 7) shown in the parts (A) and (B) of FIG. 6, and is lowered again so as to return to the lower position shown in the parts (A) and (B) of FIG. 8. It should be noted that, in FIGS. 5 to 8, portions which are common to those of FIG. 3 are denoted by the same reference numerals as those of FIG. 3, and a description thereof will be omitted or simplified. In addition, the receiving tooth portion 14A of the stationary stick supporting member 14 is shown by a thick line in order to facilitate the distinction with the receiving tooth portion 15A of the raising/lowering stick supporting member 15.

As described above, the stick S is brought onto one of the plurality of receiving tooth portions 14A of the stationary stick supporting member 14, e.g., a rearmost receiving tooth portion 14A (on the side close to the stick carrying-in device 20 in the stick arrangement direction Y).

As shown in FIG. 5(A) and as already described, the receiving tooth portions 14A of the stationary stick supporting member 14 and the receiving tooth portions 15A of the raising/lowering stick supporting member 15 are formed at the same pitch in the stick arrangement direction Y, but are positionally phase-shifted in the stick arrangement direction Y. In addition, the raising/lowering stick supporting member 15 is movable between the lower position and the upper position with respect to the stationary stick supporting member 14 by being guided through the guide grooves 15C thereof by the guide pins 14B of the stationary stick supporting member 14. In the parts (A) and (B) of FIG. 5, the raising/lowering stick supporting member 15 is at the lower position.

When the stick S is disposed on the receiving tooth portion 14A of the stationary stick supporting member 14 shown in FIG. 5, a trough portion serving as a supporting portion for the stick S is formed by the sliding edge 14A-1 and the supporting edge 14A-2, and the stick S is supported by this trough portion. At this juncture, as shown in FIG. 5(B), an end portion of the stick S is positioned above the stick receiving groove 3 formed in the stick receiving part 2 of the cart II.

Figure 6:
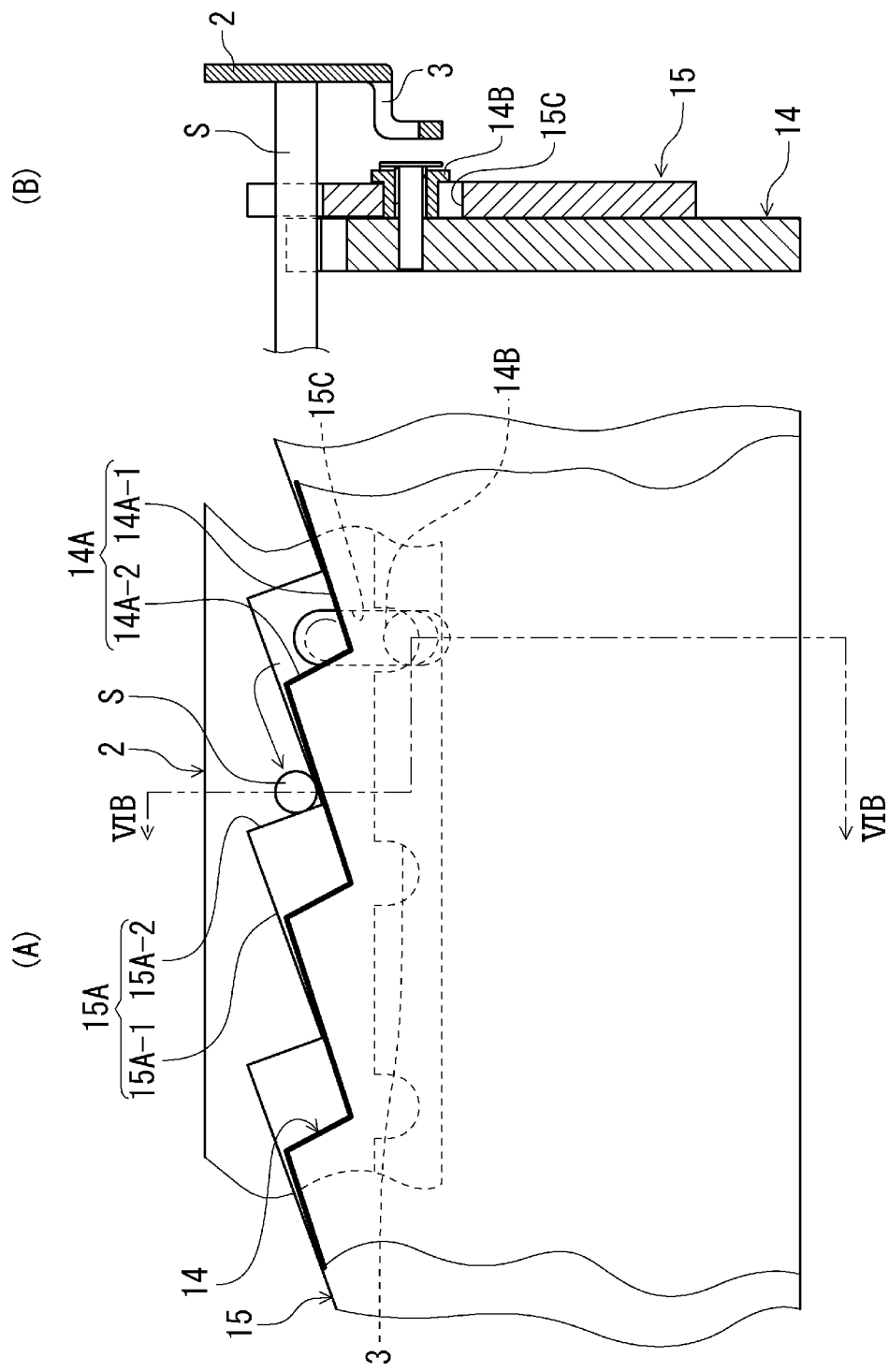
FIG. 6 illustrates the support arm device and the stick receiving part of the cart when the raising/lowering stick supporting member is at an upper position, in which part (A) is a side elevational view, and part (B) is a cross-sectional view taken along VIB-VIB.

Next, the raising/lowering stick supporting member 15 is raised from the lower position in the state of FIG. 5 to the upper position in the state of FIG. 6. When the receiving tooth portions 15A of the raising/lowering stick supporting member 15 are positioned higher than the receiving tooth portions 14A of the stationary stick supporting member 14, as shown in FIG. 6(A), the stick S is raised along the supporting edge 14A-2 of the receiving tooth portion 14A of the stationary stick supporting member 14, is transferred to the stick sliding edge 15A-1 of the receiving tooth portion 15A of the raising/lowering stick supporting member 15, and is then slid down that stick sliding edge 15A-1 in the forward direction (leftward in the drawings) (see two-dot chain line arrows F1 and F2 in FIG. 7).

Figure 7:
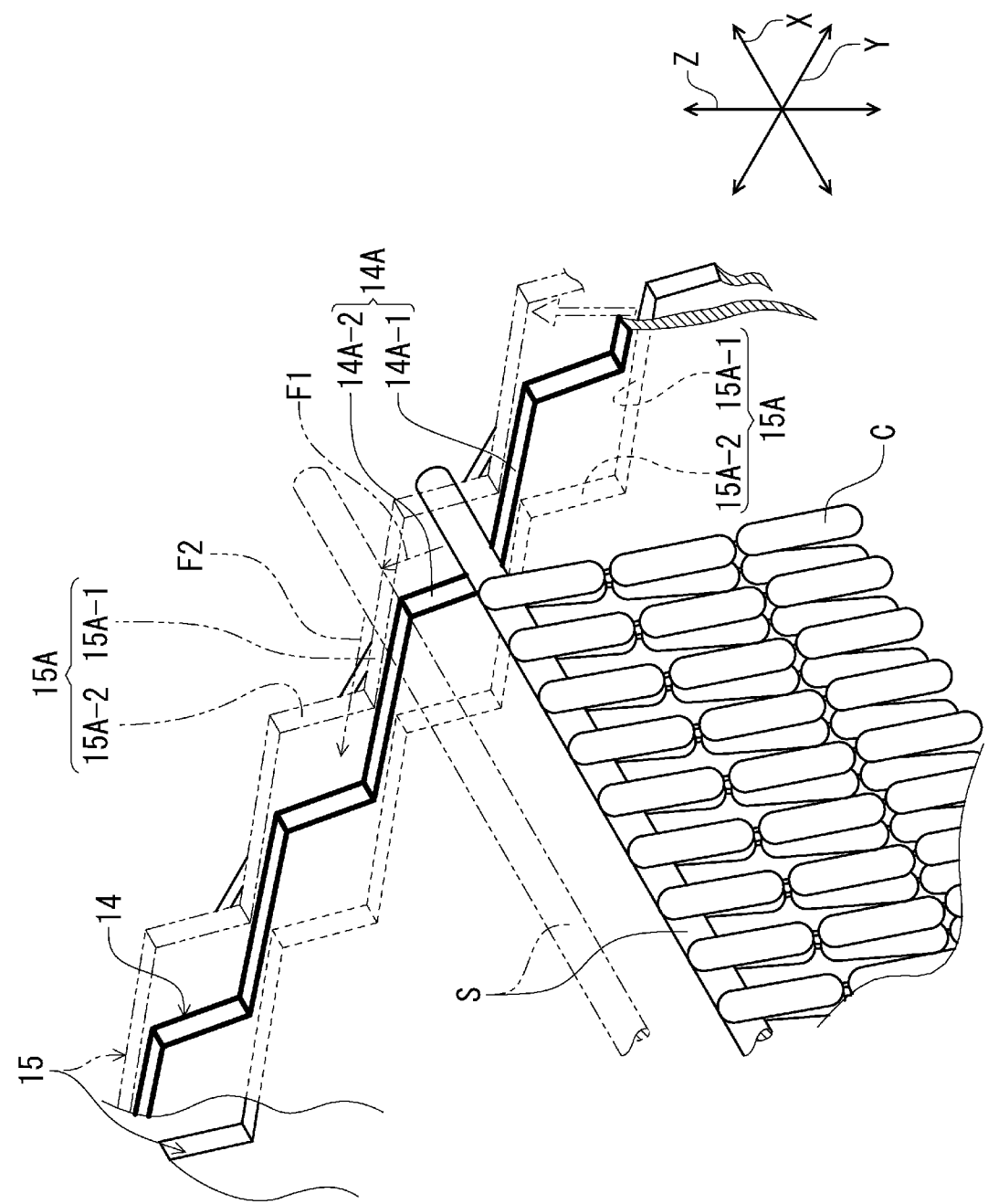
FIG. 7 is a perspective view illustrating the support arm device in FIG. 6.
Figure 8:
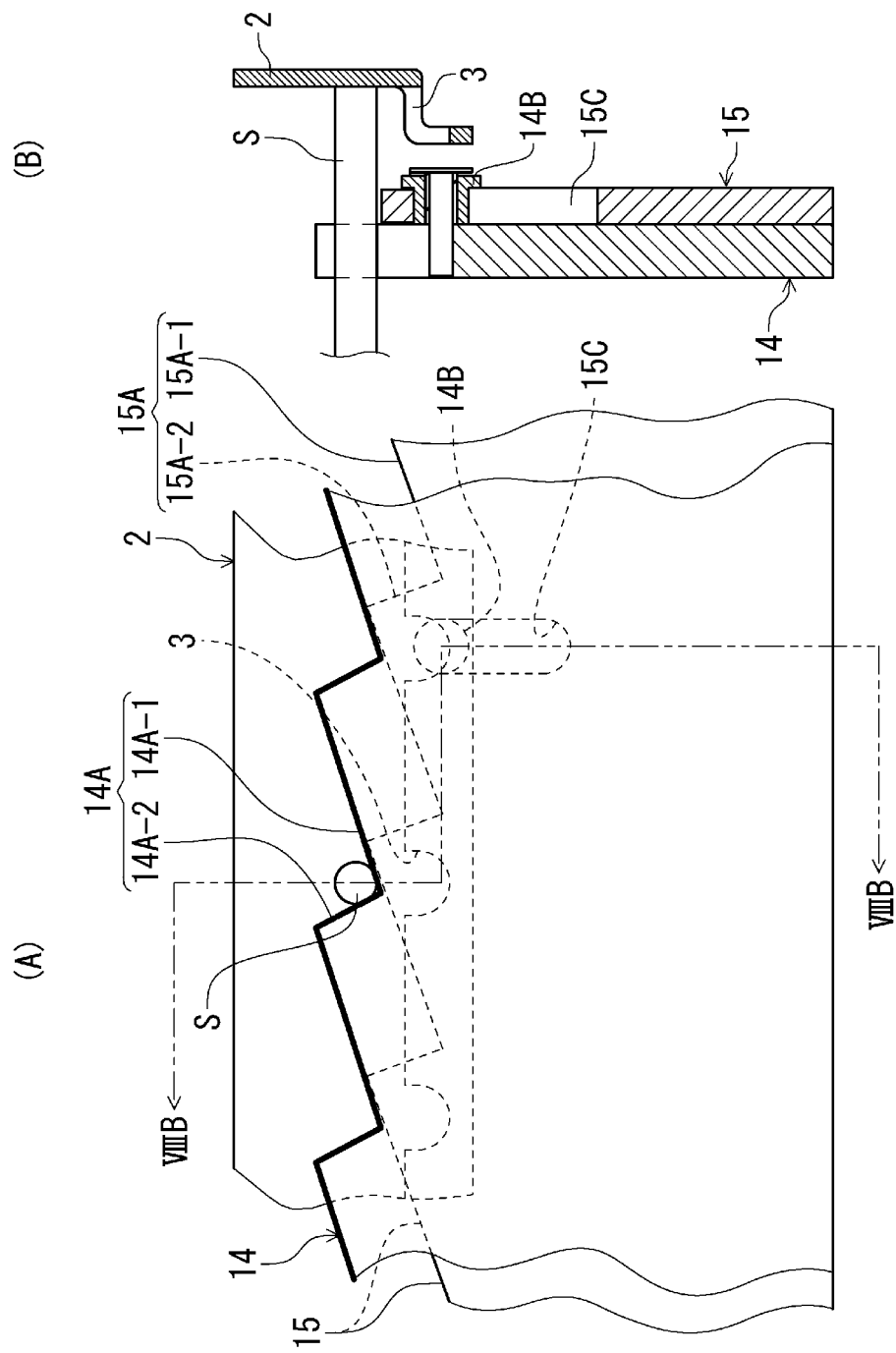
FIG. 8 illustrates the support arm device and the stick receiving part of the cart when the raising/lowering stick supporting member is returned again to the lower position, in which part (A) is a side elevational view, and part (B) is a cross-sectional view taken along VIIIB-VIIIB.

Subsequently, the raising/lowering stick supporting member 15 is lowered and returned to the lower position in FIG. 7. The raising/lowering stick supporting member 15 in this FIG. 7 is at the same position as the position in FIG. 5. However, when the raising/lowering stick supporting member 15 returns to the state of FIG. 7 from the state of FIG. 5, the stick S has been moved forwardly in the stick arrangement direction Y by one pitch portion of the receiving tooth portion 14A from the state of FIG. 5 to the state of FIG. 7, i.e., has been advanced forwardly. Thus, the stick S is advanced forwardly by one pitch at a time on the receiving tooth portions 14A each time the raising/lowering stick supporting member 15 is raised and lowered.

Thus, each time the raising and lowering operation of the raising/lowering stick supporting members 15 is carried out, the stick S, which is successively brought to the rearmost receiving tooth portion 14A of each stationary stick supporting member 14 by the stick carrying-in device 20, is advanced forwardly by one pitch at a time on the receiving tooth portions 14A. At the point of time when the sticks S are placed on all the receiving tooth portions 14A, the stick carrying-in device 20 successively conveys the sticks S onto the stationary stick supporting members 14 of a next-stage support arm devices 13 in the above-described procedure, and the placement of the sticks S on the stationary stick supporting members 14 at this stage is completed. Moreover, since the forward movement of the sticks S on the support arm devices 13 is carried out while the next stick S is taken up by the stick carrying-in device 20, the time duration until the next stick S is taken up, i.e., the cycle time, becomes short. In addition, since the forward advance of the stick S is effected by the oblique sliding on the stick sliding edge 14A-1, the impact at the time when the forward advance is stopped is small.

Figure 9:
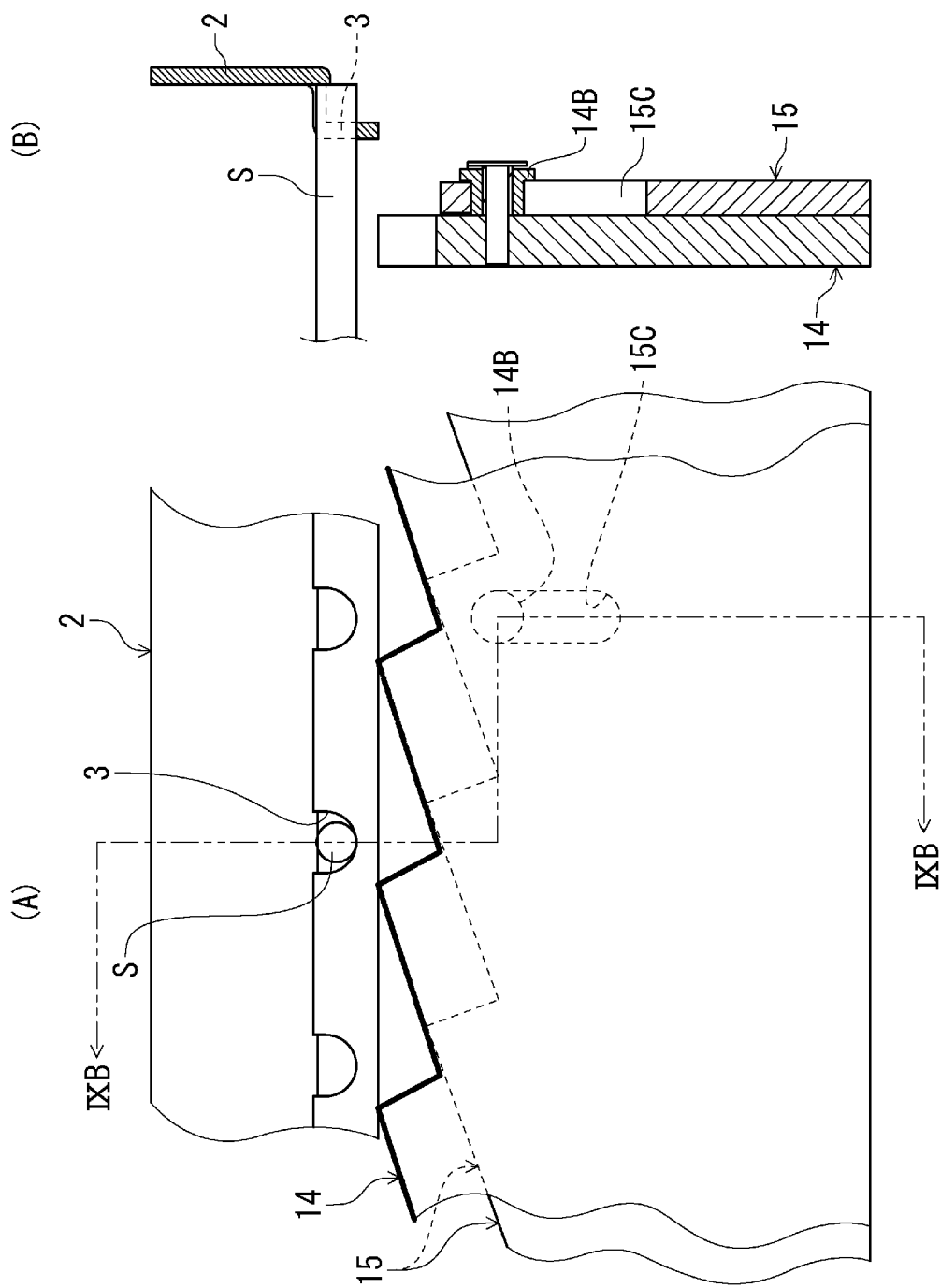
FIG. 9 illustrates the support arm device and the stick receiving part of the cart when the stationary stick supporting member and the raising/lowering stick supporting member at the lower position are collectively lowered, in which part (A) is a side elevational view, and part (B) is a cross-sectional view taken along IXB-IXB.

When the placement of the sticks S on the stationary stick supporting members 14 of the support arm devices 13 of all stages is completed, the movable part 11B located at a lower portion of the support arm column 11 is contracted by the actuation of the drive unit 11A, and the support arm column 11 is lowered by a predetermined distance corresponding to this contracted portion. Therefore, the support arm device 13 fixed to and supported by the support arm columns 11, i.e., the stationary stick supporting member 14 and the raising/lowering stick supporting member 15, are integrally lowered by the aforementioned distance. Accordingly, as shown in FIG. 9, all the sticks S supported on the stationary stick supporting members 14 of the support arm devices 13 of all stages are delivered to the stick receiving grooves 3 of the corresponding stick receiving parts 2 of the cart II. At such a point of time, the delivery of the sticks S to the cart II is completed, and the cart II is moved in such a manner as to be drawn out from the stick delivering apparatus I and carries the stuffed casings to an ensuing process.

The present invention is not confined to the above-described way in which, when a plurality of sticks with stuffed casings suspended therefrom are sequentially supported on a plurality of (in the illustrated case, four) stages of support arm devices, the sticks are sequentially placed on all the receiving tooth portions of the uppermost-stage support arm devices, starting with the forefront receiving tooth portions, as already described, and subsequently the sticks are similarly successively placed on all the receiving tooth portions of the lower-stage support arm devices. In the present invention, however, it is possible to place the sticks on alternate ones of the plurality of stages of support arm devices.

For example, in a case where the suspension length of the stuffed casing from the stick extends in a range which corresponds to two stages of support arm devices, in a conventional apparatus, after the sticks are sequentially placed on predetermined receiving tooth portions starting with forefront receiving tooth portions, the sticks are placed on all the receiving tooth portions of the third-stage support arm devices without placing the sticks on the second-stage support arm devices. In the case of such suspension, the stuffed casing on the stick supported on the uppermost-stage support arm devices reaches the position of the second-stage support arm devices, but does not reach the third-stage support arm devices; therefore, the stuffed casing on the stick supported on the uppermost-stage support arm devices does not come into contact with the stuffed casing suspended from the stick supported on the third-stage support arm devices. However, in the respective support arm devices in the uppermost stage and the third stage, since the sticks are supported on all the receiving tooth portions, the suspended casings which are suspended from the sticks supported on adjacent receiving tooth portions are arranged closely, and if the suspension length of the stuffed casings is long, the suspended casings are liable to sway and are likely to brought into contact with each other. Accordingly, since the stuffed casings which are suspended from sticks supported on the uppermost- and third-stage support arm devices are arranged closely to each other, as described above, ventilation at the time of subsequent smoke treatment is not good, and if the stuffed casings remain in contact with each other even partially, faulty smoking can result.

In contrast, in the present invention, sticks are sequentially supported on the support arm devices of predetermined stages, ranging from the uppermost stage to the fourth stage, i.e., the lowest stage. For example, on the uppermost- and third-stage support arm devices, sticks are placed on receiving tooth portions odd-numbered from the front, while, on the second- and fourth-stage support arm devices, sticks are placed on receiving tooth portions even-numbered from the front. By adopting such an arrangement, even if the stuffed casings have a long length spanning two stages, stuffed casings suspended from the sticks of the uppermost stage and the third stage do not come into contact with each other in the vertical direction. Furthermore, since, on the same support arm devices, stuffed casings suspended from sticks on every other receiving tooth portion have an extra interval therebetween which corresponds to the interval for one receiving tooth portion, ventilation at the time of smoke treatment can be kept favorably. In addition, even if the stuffed casings are slightly swayed, the stuffed casings do not come into contact with each other, so that it is possible to avoid faulty smoking due to contact.

Second Embodiment

Next, a description will be given of a second embodiment of the present invention with reference to FIGS. 10 to 15. In FIGS. 10 to 15, portions which are common to those of FIGS. 1 to 9 are denoted by the same reference numerals, and a description thereof will be omitted.

In this embodiment as well, the stick delivering apparatus I and the cart II are provided in the same way as in the first embodiment, but some parts of the stick delivering apparatus I are different from the first embodiment, and the other portions of the stick delivering apparatus I and the cart II are the same as the first embodiment.

In this embodiment, the stick delivering apparatus I differs from that of the first embodiment in some parts of the support arm device and in the configuration of the stick carrying-in device, and in order to be distinguished from the support arm device 13 and the stick carrying-in device 20 of the first embodiment, in this embodiment, the support arm device and the stick carrying-in device are shown as a support arm device 63 and a stick carrying-in device 70 by adding "50" to the reference numeral of the first embodiment. As for the respective elements in these devices 63 and 70, reference numerals using the numbers following 63 and 70 are adopted irrespective of the presence or absence of correspondence with the first embodiment.

Figure 10:
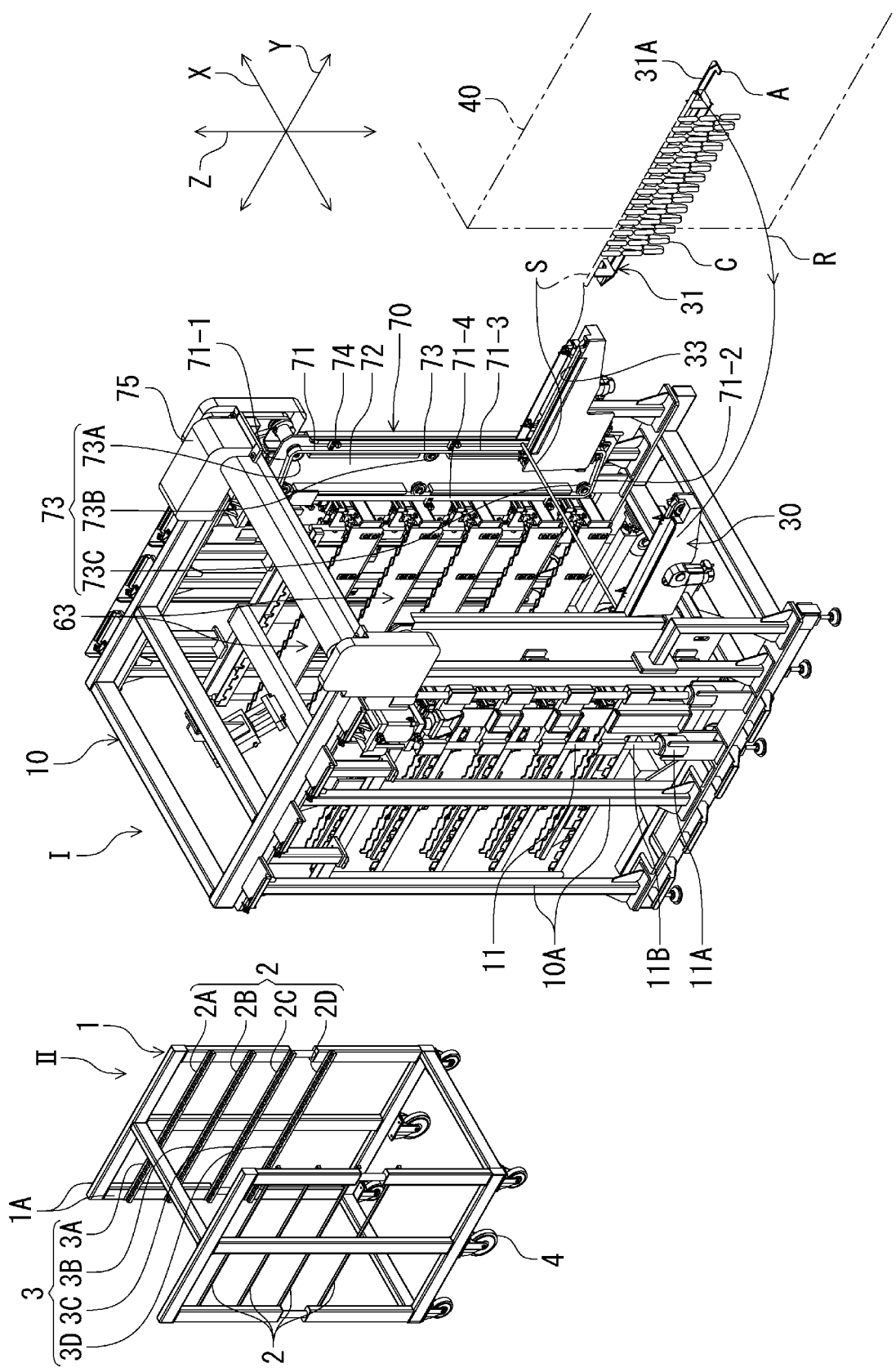
FIG. 10 is a perspective view illustrating the stick delivering apparatus as a second embodiment of the present invention together with the cart.

In FIG. 10, the stick carrying-in device 70, which takes up the stick from the stick transfer device 30 of the same configuration as that of the first embodiment and conveys it to the support arm devices 63, has a pair of endless traveling bodies 71 such as belts or chains which are provided by being located on both end sides of the outer frame body 10 in the stick longitudinal direction X and respectively form vertically elongated loops. The endless traveling body 71 is guided by a plurality of pulleys mounted on a vertically elongated flat plate-shaped support plate 72 fixed to the aforementioned outer frame body 10. The pulleys 73 include a pair of upper pulleys 73A, a pair of intermediate pulleys 73B, and a pair of lower pulleys 73C so as to form two rows in the vertical direction Z with an interval in the stick arrangement direction Y. One of the pair of upper pulleys 73A is rotationally driven by a drive motor installed on a rear surface of the support plate and accommodated in a cover 75. The endless traveling body 71, which is trained around the upper pulleys 73A, the intermediate pulleys 73B, and the lower pulleys 73C, forms a vertically elongated circulating traveling passage which includes, between an upper end direction-changing portion 71-1 and a lower end direction-changing portion 71-2, an ascending path 71-3 for moving upward on the stick transfer device 30 side and a descending path 71-4 for moving downward on the opposite side, as viewed in the stick arrangement direction Y in FIG. 10, and changes the direction at the upper end direction-changing portion 71-1 and at the lower end direction-changing portion 71-2.

Figure 11:
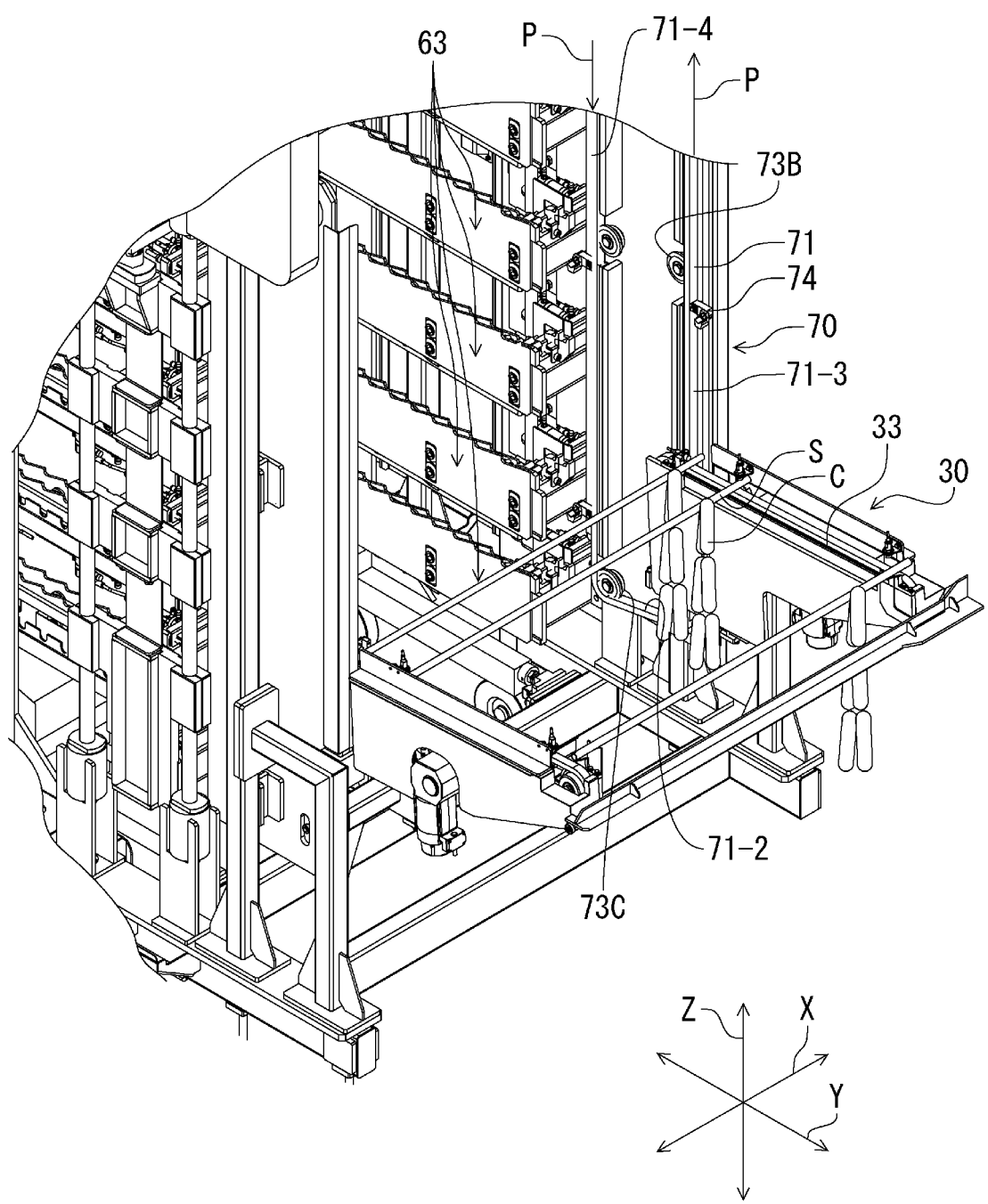
FIG. 11 is a perspective view illustrating the relationship between the stick transfer device and the stick carrying-in device concerning the apparatus of FIG. 10.

As shown in FIG. 11, the ascending path 71-3 of the endless traveling body 71 passes a forward end region of the stick transfer device 30 in the heightwise range of a portion between the intermediate pulley 73B and the lower pulley (in FIG. 11, the lower pulley on the ascending path 71-3 side is hidden by a suspended casing and is not shown; the lower pulley 73C on the descending path 71-4 side is shown) in the vertical direction Z, while the descending path 71-4 of the endless traveling body 71 passes a position in close proximity to a rear end portion of the support arm device 63 in the stick arrangement direction Y. Such an endless traveling body 71 forms in its traveling direction a stick transporting zone by its traveling zone ranging from that point of the ascending path 71-3 which exceeds the height of the stick transfer position of the chain 33 of the aforementioned stick transfer device 30 through the upper end direction-changing portion 71-1 up to the heightwise position of the support arm device 63. Meanwhile, the endless traveling body 71 forms a return zone by its traveling zone ranging from the point of the heightwise position of the support arm device 63 through the lower end direction-changing portion 71-2 up to the height of the stick transfer position of the chain 33.

Figure 12:
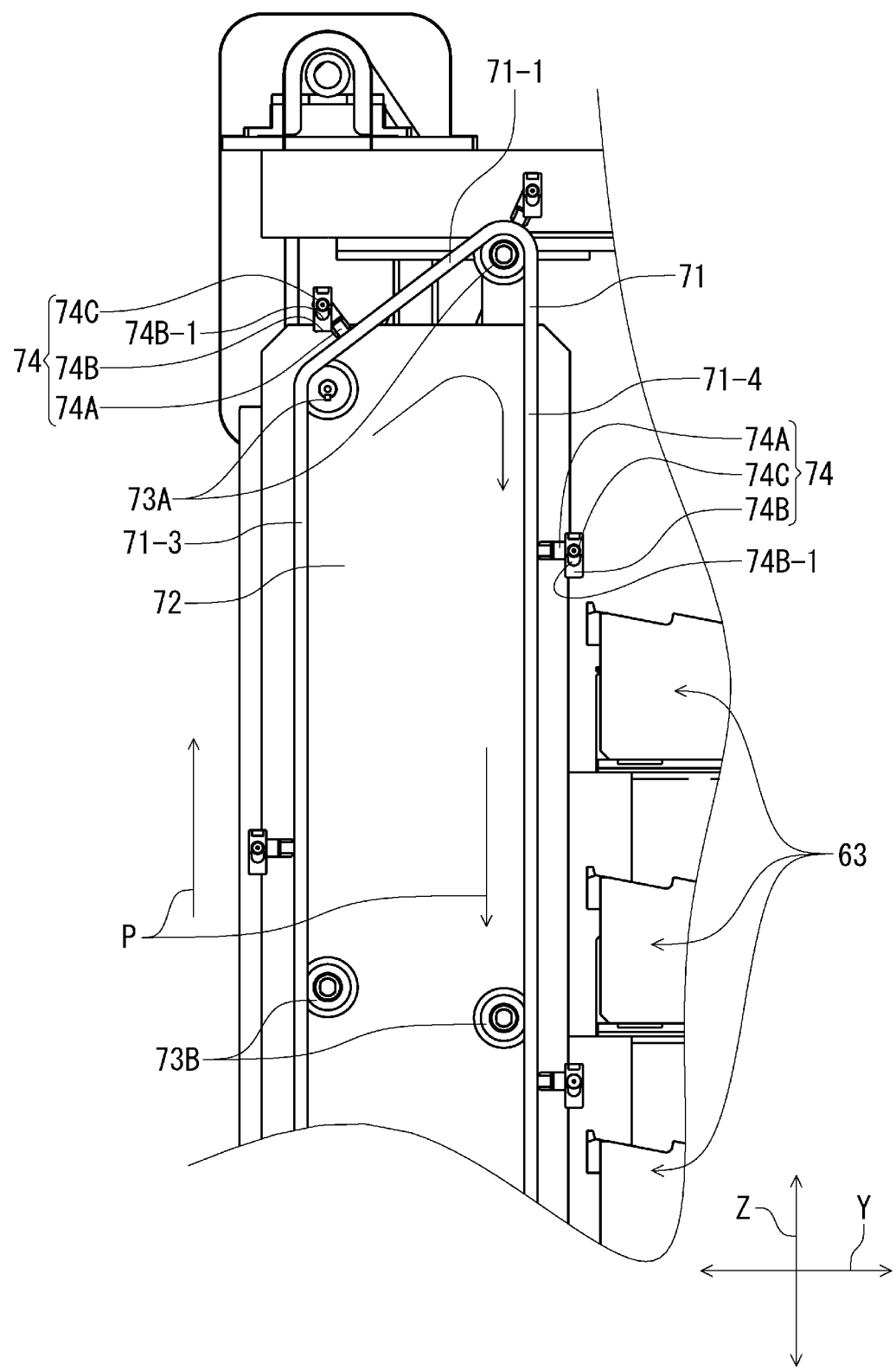
FIG. 12 is a side elevational view, taken in a stick longitudinal direction, of an upper half section, as a principal portion, of the stick carrying-in device, and illustrating the relationship with the support arm device.

As shown in FIG. 12, the endless traveling body 71 is provided with hook-shaped stick takeup parts 74 at fixed intervals. Between the pair of endless traveling bodies 71 provided at positions opposing each other in the stick longitudinal direction X, the endless traveling body 71 shown in FIG. 12 is the other endless traveling body 71 located symmetrically in the stick longitudinal direction X with respect to the endless traveling body 71 shown in FIGS. 10 and 11. Therefore, in FIG. 12, the viewing direction is opposite to that in FIGS. 10 and 11 although they are viewed in the same stick longitudinal direction X. Namely, in FIGS. 10 and 11, the traveling direction P of the endless traveling body 71 is shown as a direction in which the endless traveling body 7l circulates in the counterclockwise direction, whereas, in FIG. 12, the traveling direction P is shown as a direction in which the endless traveling body 71 circulates in the clockwise direction which is the opposite direction thereto.

As shown in FIG. 12, each of the hook-shaped stick takeup parts 74, which are mounted on the outer peripheral surface of the endless traveling body 71 and are arranged at fixed intervals in the circumferential direction, includes a mounted portion 74A which is mounted on the endless traveling body 71, a stick retaining portion 74B with a U-shaped groove portion 74B-1 formed thereon for retaining the stick, and a pin-like coupling shaft 74C for coupling the mounted portion 74A and the stick retaining portion 74B in a state in which the stick retaining portion 74B is freely rotatable with respect to the mounted portion 74A. The U-shaped groove portion 74B-1 which is upwardly open is formed on the stick retaining portion 74B, and an end portion of the stick S in the stick longitudinal direction X is adapted to be retained in the groove portion 74B-1 from above. Since such a stick retaining portion 74B is supported by being coupled to the mounted portion 74A by the coupling shaft 74C in a freely rotatable state, as the endless traveling body 71 travels, the mounted portion 74A is moved and is constantly oriented in a perpendicular direction to the outer peripheral surface of the endless traveling body 71, and its angle with respect to the horizontal plane changes at the upper end direction-changing portion 71-1 and at the lower end direction-changing portion 71-2. In contrast, since the groove portion 74B-1 of the stick retaining portion 74B is located below the coupling shaft 74C, when the stick S is supported by the groove portion 74B-1, the stick retaining portion 74B rotates (swings) about the coupling shaft 74C with respect to the mounted portion 74A irrespective of the angle (posture) of the mounted portion 74A, as shown in FIG. 12, so that the stick retaining portion 74B constantly maintains its posture in which the groove portion 74B-1 is upwardly open.

On the ascending path 71-3 of the endless traveling body 71, the stick takeup part 74 takes up the stick S on the chain 33 at the height of the stick transfer position of the stick transfer device 30 by means of the groove portion 74B-1 of the stick retaining portion 74B, then moves upwardly, and passes through the upper end direction-changing portion 71-1 where the direction is changed to the downward direction, and the stick is delivered to the below-described support arm device 63 at the heightwise position of the support arm device 63. The route ranging from the position of the height of the stick transfer position on the chain 33 through the upper end direction-changing portion 71-1 up to the heightwise position of the support arm device 63 constitutes the stick transporting zone. Accordingly, the stick transporting zone changes in its range depending on to which one of the plurality of stages of support arm devices 63 the stick is delivered. The route in which the stick takeup part 74, after delivering the stick to the support arm device 63, passes through the lower end direction-changing portion 71-2 in a stick-absent state and returns to the aforementioned stick transfer position constitutes the return zone.

Figure 13:
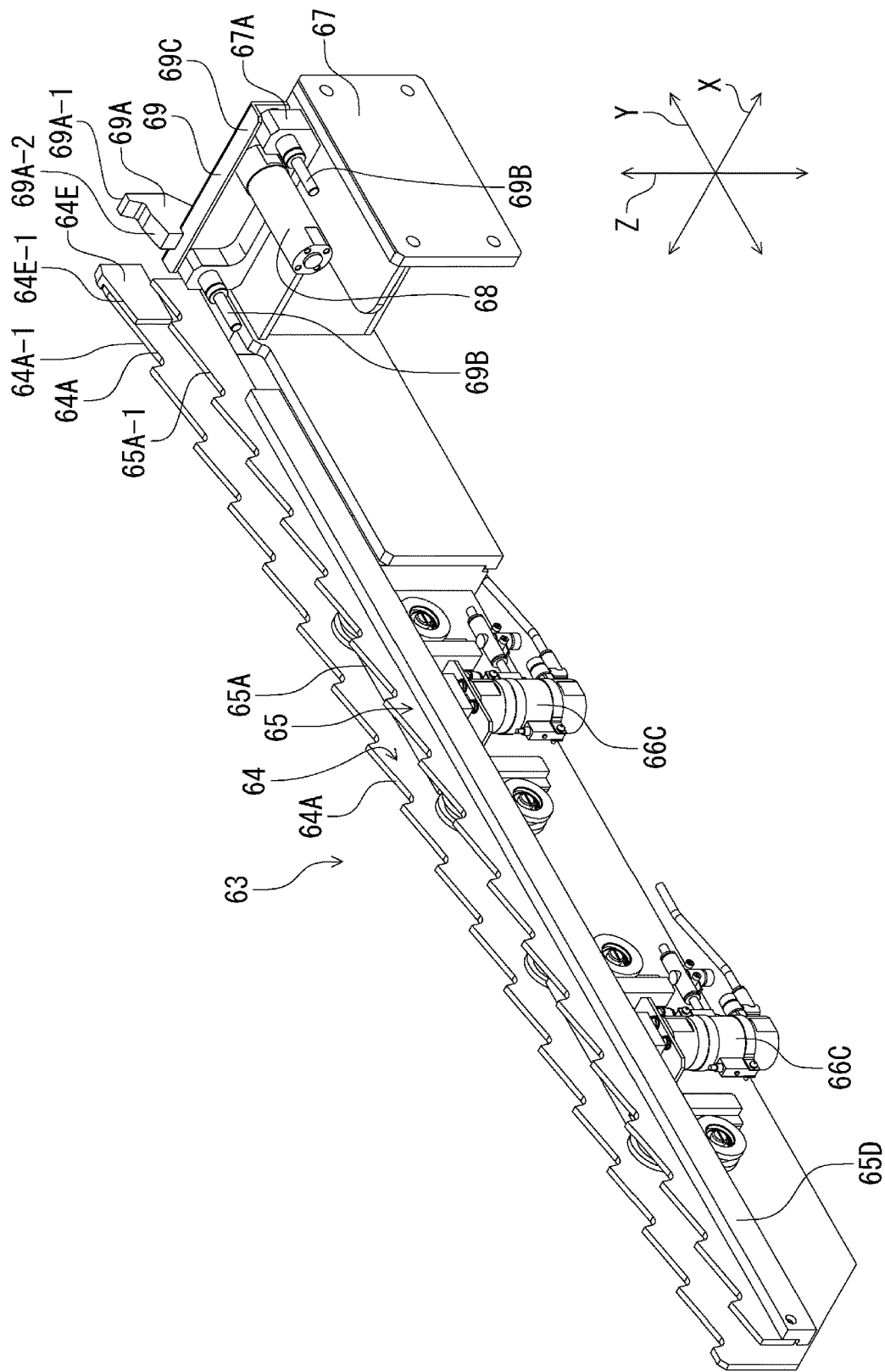
FIG. 13 is a perspective view illustrating one of the plurality of support arm devices in the apparatus of FIG. 10.
Figure 14:
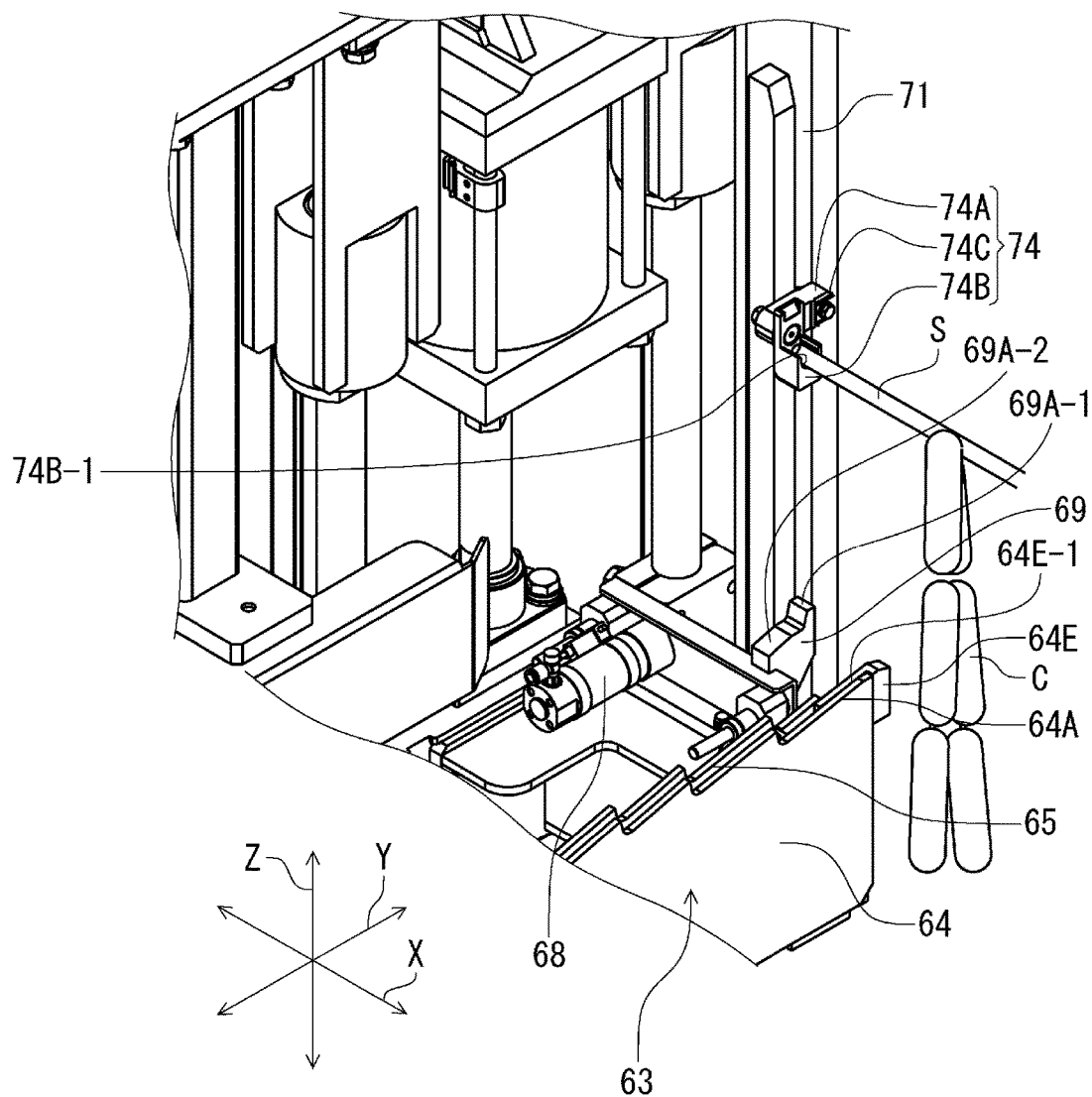
FIG. 14 is a perspective view of a rear portion of the support arm device, illustrating the relationship with the stick carrying-in device.
Figure 15:
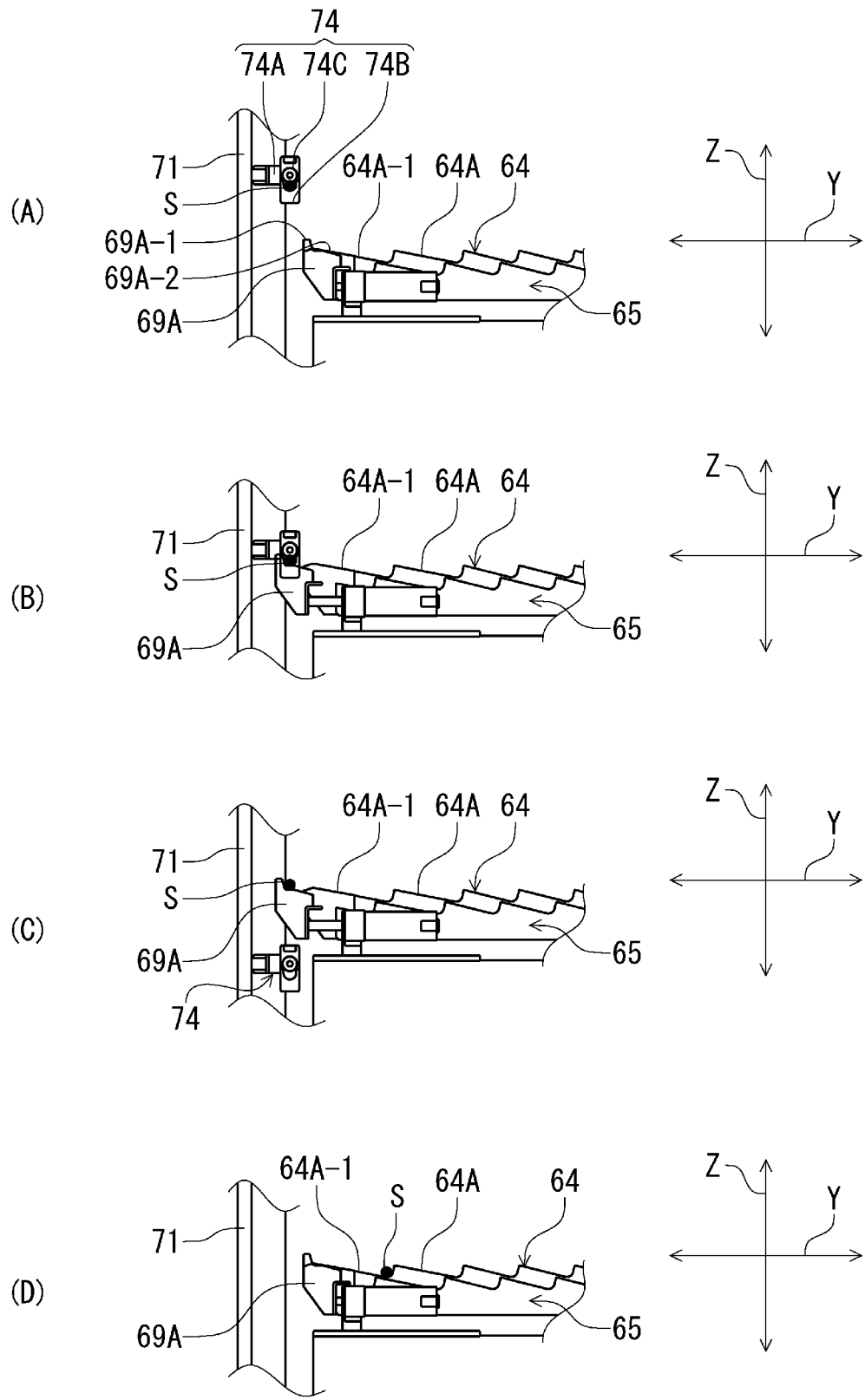
FIG. 15 is a side elevational view, illustrating in order, of the manner in which a stick is delivered from the stick carrying-in device to the support arm device, in which part (A) shows a state prior to the delivery of the stick to a stick receiving member, part (B) shows a state at the time of delivery of the stick to the stick receiving member, part (C) shows a state in which a stick takeup part provided on an endless traveling body has been lowered below the heightwise position of the stick receiving member after the delivery of the stick, and part (D) shows a state in which the stick has been transferred from the stick receiving member to the stationary stick supporting member.

As shown in FIG. 13, the support arm device 63 includes a stationary stick supporting member 64 and a raising/lowering stick supporting member 65 corresponding respectively to the stationary stick supporting member 14 and the raising/lowering stick supporting member 15 in the first embodiment, and serrated receiving tooth portions 64A and 65A are formed on respective ones of these members in the same way as in the first embodiment. Accordingly, the detailed shapes of the receiving tooth portions 64A and 65A are only indicated by adding "50" to the reference numerals of the first embodiment, and a description thereof will be omitted.

The raising/lowering stick supporting member 65 has a base member 65D which is provided at a lower edge thereof and extends along the lower edge. In the first embodiment, the raising or lowering of the raising/lowering stick supporting member 15 is effected by the rotating drive lever 16A and the drive 16C for driving it. In this embodiment, however, the base member 65D is liftably driven by a drive unit 66C constituted by a cylinder (two cylinders in the illustrated example) or a motor disposed on the lower side of the base member 65D mounted on the raising/lowering stick supporting member 65, and the raising/lowering stick supporting member 65 is thereby raised or lowered directly without interposing an indirect member such as the movable drive lever 16A in the first embodiment.

In the stationary stick supporting member 64, an extended receiving tooth member 64E is mounted at a rear end portion on the side close to the aforementioned stick carrying-in device 70 in the stick arrangement direction Y. An upper edge of the extended receiving tooth member 64E is formed as an inclined edge 64E-1, and the inclined edge 64E-1 is positioned in such a manner as to rearwardly extend a stick sliding edge 64A-1 of a receiving tooth portion 64A at a rear end of the stationary stick supporting member 64. Therefore, the stationary stick supporting member at the rear end portion thereof is at a rearward position closer to the aforementioned stick carrying-in device 70 in the stick arrangement direction Y than the raising/lowering stick supporting member 65 (see FIG. 15 as well).

In this embodiment, in the support arm device 63, the stationary stick supporting member 64 is provided stationarily on the outer frame body in the same way as the aforementioned stationary stick supporting member 14 in the first embodiment. The support arm device 63 further includes a base 67 mounted on the stationary stick supporting member 64, a cylinder unit 68 mounted on the base 67 and drivable in the stick arrangement direction Y, and a movable base 69 which reciprocates in the stick arrangement direction Y with respect to the base 67 by the cylinder unit 68, a stick receiving member 69A being mounted on the movable base 69. Two guide shafts 69B which project forwardly in the stick arrangement direction Y are provided on the movable base 69, and are guided reciprocatably in the stick arrangement direction Y by a guide frame 67A provided on the base 67.

As also shown in FIG. 13, the stick receiving member 69A includes a projecting end 69A-1 which is supported by an upper end edge 69C of the movable base 69, projects toward the stick carrying-in device 70, and is directed upwardly and a stick sliding-down inclined surface 69A-2 which becomes low in a stepped manner from the projecting end 69A-1 and forms a forwardly inclined surface. The stick receiving member 69A which is reciprocatable in the stick arrangement direction Y is positioned in close proximity on the inner side in the stick longitudinal direction X to the stick takeup part 74 mounted on the endless traveling body 71 of the stick carrying-in device 70, and, when viewed from the opposite direction to FIG. 12 in the stick longitudinal direction X, the stick sliding-down inclined surface 69A-2 of the stick receiving member 69A in the stick arrangement direction Y is adapted to reciprocally move between the position of the stick takeup part 74 mounted on the endless traveling body 71 and the position which overlaps the extended receiving tooth member 64E of the stationary stick supporting member 64 in the stick arrangement direction Y, as shown in the parts (A) to (D) of FIG. 15.

Next, a description will be given of the operation of the above-described apparatus of the second embodiment.

When the stuffed casing C is suspended from the stick S in the suspending apparatus 40, this stick S is received from the suspending apparatus 40 by the stick transfer device 30, the stick S is transferred forwardly in the stick arrangement direction Y by the chains 33 of the stick transfer device 30, and the chains 33 are stopped by a stopper or the like at the forward end position. Each end portion of the stick S projects from the chain 33 in the stick longitudinal direction X. Up to this point, the operation is the same as that of the first embodiment.

At the forward end position of the chain 33, the endless traveling body 71 of the stick carrying-in device 70 is disposed at the position of the end portion of the stick S in the stick longitudinal direction X and is traveling in a position where the ascending path 71-3 of the endless traveling body 71 is in close proximity in the stick arrangement direction Y to the stick S being at a standstill at the forward end position. Since the ascending path 71-3 of the endless traveling body 71 is positioned at the end portion of the stick in the stick longitudinal direction X, as described above, one of the stick takeup parts 74 mounted on the endless traveling body 71, when upwardly moving on the ascending path 71-3, lifts up the end portion of the stick S from below by the groove portion 74B-1 of the stick takeup part 74 and takes it up from the chain 33 and ascends. Since the pair of endless traveling bodies 71 with the stick takeup parts 74 provided thereon are provided by being positioned at both end portions of the stick S, the stick S is moved upwardly with its both ends supported by the stick takeup parts 74.

The stick takeup part 74 includes the mounted portion 74A mounted on the endless traveling body 71 and the stick retaining portion 74B with the groove portion 74B-1 formed thereon for retaining the stick S, and the stick retaining portion 74B is freely rotatably coupled to the mounted portion 74A by the coupling shaft 74C. Since the stick retaining portion 74B which supports the stick S at the groove portion 74B-1 receives the weight of the stick S and the like, irrespective of the movement of the endless traveling body 71, i.e., at whatever position the stick takeup part 74 may be in conjunction with the movement of the endless traveling body 71, i.e., whether it be the ascending path 71-3 or the descending path 71-4, although the mounted portion 74A of the stick takeup part 74 is oriented in the perpendicular direction to the moving path of the endless traveling body 71, the stick retaining portion 74B, which is freely rotatable with respect to the mounted portion 74A by having the coupling shaft 74C, maintains its posture in which the groove portion 74B-1 supporting the stick S is constantly oriented in the upward direction.

The stick S supported by the groove portion 74B-1 of the stick takeup part 74 is carried from the ascending path 71-3 through the upper end direction-changing portion 71-1 to the lower end direction-changing portion 71-2 and is brought to the support arm device 63, as will be described later. In the stick transporting zone from the time the stick S is taken up from the stick transfer device 30 until the time it is brought to the support arm device 63, the stick S is supported in a stable posture by the groove portion 74B-1 of the stick takeup part 74.

When the stick S proceeds to the descending path 71-4, the stick S is conveyed to the support arm device 63 selected among the plurality of stages of support arm devices 63. Immediately before the stick S supported by the stick takeup part 74 which downwardly moves on the descending path 71-4 reaches the position of the stick receiving member 69A in the heightwise direction, the stick receiving member 69A provided in the selected support arm device 63 moves from the forwardly advanced position shown in FIG. 15(A) to the retreated position in the stick arrangement direction Y, and is positioned below the stick S being lowered, shown in FIG. 15(B). When the stick takeup part 74 which is being downwardly moved passes the heightwise position of that stick receiving member 69A, the stick S is moved from the stick takeup part 74 onto the stick receiving member 69A and is thereby taken up.

When the stick S is moved onto the stick receiving member 69A, the stick takeup part 74 moves below the position of that stick receiving member 69A in conjunction with the traveling of the endless traveling body 71 (see FIG. 15C), moves in the return zone through the lower end direction-changing portion 71-2, and proceeds to the heightwise position of the chain 33 of the stick transfer device 30 to take up a next stick. Meanwhile, a next following stick takeup part 74 takes up a next stick S from the chain 33 at the heightwise position of the chain 33 of the stick transfer device 30.

In the meantime, when the downwardly moving stick takeup part 74 mounted on the endless traveling body 71 passes the heightwise position of the stick receiving member 69A, the stick receiving member 69A, which received the stick S from the stick takeup part 74, advances forwardly immediately thereafter and reaches from the position of FIG. 15(C) the position of FIG. 15(D), i.e., its forwardly advanced position which is the position of the extended receiving tooth member 64E located at the rearmost position of the stationary stick supporting member 64 of the support arm device 63. When the stick receiving member 69A reaches the forwardly advanced position, the stick sliding-down inclined surface 69A-2 and the inclined edge 64E-1 of the receiving tooth of the extended receiving tooth member 64E, when viewed in the stick longitudinal direction X, are at the position of the same inclined edge, so that the stick S slides down the stick sliding-down inclined surface 69A-2 of the stick receiving member 69A owing to the self-weight of the stick S and the weight of the stuffed casing and is transferred to the inclined edge 64E-1 of the extended receiving tooth member 64E. Thus, the stick S is delivered to the receiving tooth portion 64A at the rear end of the stationary stick supporting member 64 of the support arm device 63.

Subsequently, in the state in which the stationary stick supporting member 64 is supporting the stick S on the receiving tooth portion 64A at its rear end, the raising/lowering stick supporting member 65 is raised by the driving of the drive unit 66C to move the stick S onto the receiving tooth portion 65A of the raising/lowering stick supporting member 65. Each time the raising/lowering stick supporting member 65 is raised and lowered in a repeated manner, the stick S is sequentially transferred and advanced forwardly from one receiving tooth portion 65A to another in the forward direction. This movement of the stick S from the stationary stick supporting member 64 to the raising/lowering stick supporting member 65 and the forward advance of the stick S based on the repeated raising and lowering of the raising/lowering stick supporting member 65 are based on the same operating principle as that in the first embodiment, and each time the stick S, which is sequentially carried in by the hook-shaped stick takeup part 74 provided on the endless traveling body 71 of the stick carrying-in device 70, is received by the stick receiving member 69A and is brought to the stationary stick supporting member 64 of the support arm device 63, the stick S is sequentially advanced forwardly by the raising movement of the raising/lowering stick supporting member 65. Thus, the sticks S are disposed and supported on the predetermined receiving tooth portions 64A of the stationary stick supporting member 64 of each of one pair of support arm devices 63.

Thereafter, the sticks S which are carried in by the stick carrying-in device 70 are brought to the other support arm devices 63. Thus, the sticks S are supported on the receiving tooth portions 64A of the predetermined stationary stick supporting members 64 of all the support arm devices 63. In such a state, all the support arm devices 63 are lowered by the operation of the drive units 11A of the movable parts 11B provided at lower positions of the outer frame body 10, and the sticks S are collectively delivered to the cart II. This operation is the same as in the case of the first embodiment.

DESCRIPTION OF REFERENCE NUMERALS

2: stick receiving part
13: support arm device
14: stationary stick supporting member
14A: receiving tooth portion
14A-1: stick sliding edge
15: raising/lowering stick supporting member
15A: receiving tooth portion
15A-1: stick sliding edge
20: stick carrying-in device
28: stick takeup part
30: stick transfer device
40: suspending apparatus
63: support arm device
64: stationary stick supporting member
64A: receiving tooth portion
69A: stick receiving member
70: stick carrying-in device
71-1: upper end direction-changing portion
71-2: lower end direction-changing portion
74: stick takeup part
D: receiving space
S: stick
X: stick longitudinal direction
Y: stick arrangement direction
Z: vertical direction
I: stick delivering apparatus
II: cart

The invention claimed is:

1. A stick delivering apparatus for delivering sticks from support arm devices to stick receiving parts of a cart, comprising support arm devices having supporting portions by which a stick from which a stuffed casing with contents stuffed therein is suspended and is supported at each end portion of the stick, the supporting portions being formed at a plurality of positions in a stick arrangement direction perpendicular to a longitudinal direction of the stick, wherein a receiving space capable of receiving the stick receiving part of the cart in the stick arrangement direction is formed in said stick delivering apparatus at a position in close proximity to said support arm device in a stick longitudinal direction, and wherein said support arm device includes a stationary stick supporting member parallel with the stick receiving part of the cart and extending in the stick arrangement direction and a raising/lowering stick supporting member disposed in close proximity to said stationary stick supporting member in the stick longitudinal direction and extending in the stick arrangement direction in parallel therewith, wherein each of said stationary stick supporting member and said raising/lowering stick supporting member has a plurality of serrated receiving tooth portions, each of the receiving tooth portions has a stick sliding edge which is inclined with respect to a horizontal plane, and said stationary stick supporting member receives the stick by a trough portion which is a supporting portion formed by the receiving tooth portion, and wherein the receiving tooth portion of said raising/lowering stick supporting member is at a position offset in the stick arrangement direction from the receiving tooth portion of said stationary stick supporting member, and said raising/lowering stick supporting member is reciprocatable between a lower position and an upper position with respect to said stationary stick supporting member.

2. The stick delivering apparatus according to claim 1, wherein said support arm devices are provided in a plurality of stages in a vertical direction.

3. The stick delivering apparatus according to claim 1, wherein one of two upper edge portions forming the trough portion of the receiving tooth portion constitutes the stick sliding edge and has a gentler slope with respect to the horizontal plane than another one of the two upper edge portions.

4. The stick delivering apparatus according to claim 1, further comprising a stick carrying-in device for taking up each stick with the stuffed casing suspended therefrom and conveys the stick onto the receiving tooth portion of said stationary stick supporting member.

5. The stick delivering apparatus according to claim 4, further comprising a stick transfer device which receives each stick from a suspending apparatus for suspending a stuffed casing from a stick and transfers the stick to the stick carrying-in device, and the stick carrying-in device has a stick takeup part for taking up the stick from the stick transfer device.

6. The stick delivering apparatus according to claim 5, wherein the stick carrying-in device has a pair of hook-shaped stick takeup parts projecting in the stick arrangement direction and respectively provided at both ends of a horizontal member extending in the stick longitudinal direction, and is liftable between the stick transfer device and said stationary stick supporting member of the support arm device in the vertical direction, and wherein the stick carrying-in device is movable in the stick arrangement direction, takes up a stick from the stick transfer device by the stick takeup parts, and conveys the stick to the receiving tooth portions of the stationary stick supporting members.

7. The stick delivering apparatus according to claim 1, further comprising a stick carrying-in device for taking up each stick with the stuffed casing suspended therefrom and conveys the stick to a heightwise position of the receiving tooth portion of the stationary stick supporting member.

8. The stick delivering apparatus according to claim 7, wherein the stick carrying-in device is formed by an endless traveling body which is provided with hook-shaped stick takeup parts projecting in such a manner as to be capable of retaining a stick and which travels in a circulating manner between an upper end direction-changing portion and a lower end direction-changing portion, and the endless traveling body has a stick transporting zone in which the stick is transported by being supported by the stick takeup part and a return zone in which the endless traveling body travels in a stick absent state after discharging of the stick from the stick takeup part.

9. The stick delivering apparatus according to claim 8, further comprising a stick transfer device which receives each stick from a suspending apparatus for suspending a stuffed casing from a stick and transfers the stick to the stick carrying-in device, wherein a lower end position of the stick transporting zone in the endless traveling body of the stick carrying-in device is located below the position of stick transfer by the stick transfer device, and, when passing the stick transfer position in an upward direction, the hook-shaped stick takeup part of the stick carrying-in device takes up the stick from the stick transfer device.

10. The stick delivering apparatus according to claim 7, wherein the support arm device has a stick receiving member which is reciprocatable between the receiving tooth portion of said stationary stick supporting member and a stick transporting zone in an endless traveling body of the stick carrying-in device in the stick arrangement direction, and when the stick takeup part on the endless traveling body has reached the heightwise position of the stick receiving member, the stick receiving member receives the stick from the stick takeup part, moves to the position of the receiving tooth portion of said stationary stick supporting member of the support arm device, and places the stick on the receiving tooth portion.

11. A support arm device for a stick delivering apparatus for delivering to a cart, sticks from each of which a stuffed casing with contents stuffed therein is suspended, the support arm device comprising supporting portions for supporting each end portion of the stick, the supporting portions being formed at a plurality of positions in a stick arrangement direction, perpendicular to a longitudinal direction of the stick, wherein said support arm device includes a stationary stick supporting member extending in the stick arrangement direction perpendicular to the longitudinal direction of the stick and a raising/lowering stick supporting member disposed in close proximity to said stationary stick supporting member in the stick longitudinal direction and extending in the stick arrangement direction in parallel therewith, wherein each of said stationary stick supporting member and said raising/lowering stick supporting member has a plurality of serrated receiving tooth portions, each of the receiving tooth portions has a stick sliding edge which is inclined with respect to a horizontal plane, and said stationary stick supporting member receives the stick by a trough portion which is a supporting portion formed by the receiving tooth portion, and wherein the receiving tooth portion of said raising/lowering stick supporting member is at a position offset in the stick arrangement direction from the receiving tooth portion of said stationary stick supporting member, and said raising/lowering stick supporting member is reciprocatable between a lower position and an upper position with respect to said stationary stick supporting member.

\* \* \* \* \*